United States Patent
Mdini et al.

(10) Patent No.: US 11,736,339 B2
(45) Date of Patent: Aug. 22, 2023

(54) AUTOMATIC ROOT CAUSE DIAGNOSIS IN NETWORKS

(71) Applicant: EXFO Solutions SAS, Rennes (FR)

(72) Inventors: Maha Mdini, Rennes (FR); Gwendal Simon, Rennes (FR); Alberto Blanc, Chantepie (FR); Julien Lecoeuvre, Cesson-Sevigne (FR)

(73) Assignee: EXFO SOLUTIONS SAS, Rennes (FR)

( * ) Notice: Subject to any disclaimer, the term of this patent is extended or adjusted under 35 U.S.C. 154(b) by 0 days.

(21) Appl. No.: 17/835,467

(22) Filed: Jun. 8, 2022

(65) Prior Publication Data

US 2022/0303168 A1 Sep. 22, 2022

Related U.S. Application Data

(62) Division of application No. 16/659,874, filed on Oct. 22, 2019, now Pat. No. 11,388,040.

(Continued)

(51) Int. Cl.
*H04L 41/0631* (2022.01)
*H04L 41/0604* (2022.01)
(Continued)

(52) U.S. Cl.
CPC ........ *H04L 41/065* (2013.01); *H04L 41/0613* (2013.01); *H04L 43/0817* (2013.01); *H04L 43/0823* (2013.01); *H04L 43/16* (2013.01)

(58) Field of Classification Search
CPC ............... H04L 41/065; H04L 41/0613; H04L 43/0817; H04L 43/0823; H04L 43/16
See application file for complete search history.

(56) References Cited

U.S. PATENT DOCUMENTS

| 5,761,653 A | 6/1998 | Schiefer et al. |
| 7,467,067 B2 | 12/2008 | Marvasti |

(Continued)

FOREIGN PATENT DOCUMENTS

| CN | 102801587 A | 11/2012 |
| EP | 3648406 A2 | 5/2020 |

(Continued)

OTHER PUBLICATIONS

Shapley, L. S., Notes on the n-Person Game—II: The Value of an n-Person Game, U.S. Air Force Project Rand, Research Memorandum, Aug. 21, 1951.

(Continued)

*Primary Examiner* — Joseph L Greene
(74) *Attorney, Agent, or Firm* — McDonnell Boehnen Hulbert & Berghoff LLP

(57) ABSTRACT

An embodiment may involve: (i) obtaining a set of data records that include respective pluralities of tuples characterizing operation of communication sessions in a network and that identify hardware or software components related to the network that were involved in the communication sessions, (ii) determining degrees to which signatures in the pluralities of tuples are associated with communication problems in the network; (iii) identifying, from the degrees, a subset of the signatures most associated with the communication problems; (iv) grouping specific pairs from the subset of the signatures into equivalence classes based on co-occurrence of signatures of the specific pairs within the data records; (v) generating and pruning a dependency graph between the equivalence classes; (vi) from the equivalence classes remaining in the dependency graph, selecting a subset of the hardware or software components related to the network that are candidates for involvement with the communication problems.

20 Claims, 12 Drawing Sheets

Related U.S. Application Data

(60) Provisional application No. 62/881,457, filed on Aug. 1, 2019, provisional application No. 62/854,649, filed on May 30, 2019, provisional application No. 62/830,633, filed on Apr. 8, 2019.

(51) Int. Cl.
*H04L 43/16* (2022.01)
*H04L 43/0823* (2022.01)
*H04L 43/0817* (2022.01)

(56) References Cited

U.S. PATENT DOCUMENTS

| | | |
|---|---|---|
| 7,590,728 B2 | 9/2009 | Tonnesen |
| 7,617,170 B2 | 11/2009 | Chesla |
| 7,620,523 B2 | 11/2009 | Marvasti et al. |
| 7,783,745 B1 | 8/2010 | Bhargava et al. |
| 7,886,064 B2 | 2/2011 | Nomura et al. |
| 7,953,685 B2 | 5/2011 | Liu et al. |
| 8,582,457 B2 | 11/2013 | Leemet et al. |
| 8,949,677 B1 | 2/2015 | Brundage et al. |
| 9,026,644 B2 | 5/2015 | Parker et al. |
| 9,122,602 B1 | 9/2015 | Jewell et al. |
| 9,172,593 B2 | 10/2015 | Kane |
| 9,298,538 B2 | 3/2016 | Marvasti et al. |
| 9,414,247 B2 | 8/2016 | Huang |
| 9,418,088 B1 | 8/2016 | Noll |
| 9,516,053 B1 | 12/2016 | Muddu et al. |
| 9,614,742 B1 | 4/2017 | Zhang et al. |
| 9,654,361 B2 | 5/2017 | Vasseur et al. |
| 9,667,521 B2 | 5/2017 | Pietrowicz et al. |
| 9,727,533 B2 | 8/2017 | Thibaux |
| 9,729,386 B2 | 8/2017 | Kiesekamp et al. |
| 9,760,240 B2 | 9/2017 | Maheshwari et al. |
| 9,853,867 B2 | 12/2017 | Baccarani |
| 9,900,332 B2 | 2/2018 | Muddu et al. |
| 9,952,921 B2 | 4/2018 | Kim et al. |
| 9,961,571 B2 | 5/2018 | Fang et al. |
| 10,061,637 B1 | 9/2018 | Halbersberg et al. |
| 10,083,073 B2 | 9/2018 | Ambichl et al. |
| 10,127,695 B2 | 11/2018 | Garvey et al. |
| 10,165,457 B2 | 12/2018 | Fernandez Arboleda et al. |
| 10,198,339 B2 | 2/2019 | Salunke et al. |
| 10,210,036 B2 | 2/2019 | Iyer et al. |
| 10,210,038 B2 | 2/2019 | Sasturkar |
| 10,289,473 B2 | 5/2019 | Mendes et al. |
| 10,397,810 B2 | 8/2019 | Fang et al. |
| 10,489,363 B2 | 11/2019 | Fang et al. |
| 10,515,079 B2 | 12/2019 | Chamarajnagar |
| 10,637,744 B2 | 4/2020 | Carroll et al. |
| 10,686,681 B2 | 6/2020 | Medas et al. |
| 10,708,344 B1 | 7/2020 | Zhao et al. |
| 10,715,391 B2 | 7/2020 | Rahman et al. |
| 10,771,313 B2 | 9/2020 | Tedaldi et al. |
| 10,867,036 B2 | 12/2020 | Komarek et al. |
| 11,032,303 B1 | 6/2021 | Efstathopoulos et al. |
| 11,138,163 B2 | 10/2021 | Mdini et al. |
| 2004/0260694 A1* | 12/2004 | Chaudhuri ............ G06F 16/215 707/999.005 |
| 2005/0003827 A1 | 1/2005 | Whelan |
| 2005/0216241 A1 | 9/2005 | Entin |
| 2007/0055662 A1 | 3/2007 | Edelman |
| 2013/0097463 A1 | 4/2013 | Marvasti et al. |
| 2013/0110761 A1 | 5/2013 | Viswanathan et al. |
| 2013/0262656 A1 | 10/2013 | Cao et al. |
| 2015/0019916 A1 | 1/2015 | Kane |
| 2016/0021173 A1 | 1/2016 | Tapia |
| 2016/0072599 A1* | 3/2016 | Kariyappa ........ G11B 20/10527 700/94 |
| 2016/0183109 A1 | 6/2016 | Kiesekamp et al. |
| 2016/0241429 A1 | 8/2016 | Froehlich |
| 2016/0253366 A1 | 9/2016 | Hsu et al. |
| 2017/0004166 A1 | 1/2017 | Biem et al. |
| 2017/0085456 A1 | 5/2017 | Whitner et al. |
| 2017/0147930 A1 | 5/2017 | Bellala et al. |
| 2017/0161131 A1 | 6/2017 | Noll |
| 2017/0207948 A1 | 7/2017 | Ratakonda et al. |
| 2017/0302554 A1 | 10/2017 | Chandrasekaran et al. |
| 2017/0331673 A1 | 11/2017 | Iyer et al. |
| 2018/0034685 A1 | 2/2018 | Naous |
| 2018/0039555 A1 | 2/2018 | Salunke et al. |
| 2018/0046926 A1 | 2/2018 | Achin et al. |
| 2018/0063142 A1* | 3/2018 | Ashiya ................... H04L 63/10 |
| 2018/0219889 A1 | 8/2018 | Oliner et al. |
| 2018/0276063 A1 | 9/2018 | Mendes et al. |
| 2018/0285685 A1 | 10/2018 | Singh et al. |
| 2018/0300737 A1 | 10/2018 | Bledsoe et al. |
| 2018/0308001 A1 | 10/2018 | Doddala et al. |
| 2019/0102718 A1 | 4/2019 | Agrawal et al. |
| 2019/0124099 A1 | 4/2019 | Matselyukh |
| 2019/0132250 A1 | 5/2019 | Horn et al. |
| 2019/0149396 A1 | 5/2019 | Zafer et al. |
| 2019/0163551 A1 | 5/2019 | Cheriton |
| 2019/0165988 A1 | 5/2019 | Wang et al. |
| 2019/0260764 A1 | 8/2019 | Humphrey et al. |
| 2020/0059800 A1 | 2/2020 | Menon et al. |
| 2020/0082013 A1 | 3/2020 | Triplet et al. |
| 2020/0136891 A1 | 4/2020 | Mdini |
| 2020/0167393 A1 | 5/2020 | Gottlob et al. |
| 2020/0183946 A1 | 6/2020 | Pelloin |
| 2020/0278972 A1 | 9/2020 | Zhou et al. |
| 2021/0006453 A1 | 1/2021 | Dutta et al. |
| 2021/0014107 A1 | 1/2021 | Mijumbi et al. |
| 2021/0117863 A1 | 4/2021 | Soleimani et al. |
| 2021/0110294 A1 | 5/2021 | Elewitz et al. |
| 2021/0136098 A1 | 5/2021 | Stergioudis et al. |
| 2021/0184958 A1 | 6/2021 | Kolar et al. |
| 2021/0250222 A1 | 8/2021 | Boussac et al. |
| 2021/0385331 A1 | 12/2021 | Kovvali et al. |

FOREIGN PATENT DOCUMENTS

| | | |
|---|---|---|
| EP | 3764592 A1 | 1/2021 |
| EP | 3849142 A1 | 7/2021 |
| EP | 3866395 A1 | 8/2021 |
| JP | 4721362 B2 | 4/2011 |
| WO | 2012113436 A1 | 8/2012 |
| WO | 2014040633 A1 | 3/2014 |
| WO | 2016169616 A1 | 10/2016 |
| WO | 2017172541 A1 | 10/2017 |
| WO | 2017220107 A1 | 12/2017 |
| WO | 2018188733 A1 | 10/2018 |

OTHER PUBLICATIONS

Shapley, L. S., A Value for n-Person Games, Mar. 18, 1952.

Fisher, Walter D., On Grouping for Maximum Homogeneity, Journal of the America Statistical Association, Dec. 1958, vol. 53, No. 284, pp. 789-798.

Lipovetsky et al., Analysis of regression in game theory approach, Applied Stochastic Models in Business and Industry Appl. Stochastic Models Bus. Ind., 2001: 17:319-330 (DOI: 10.1002/asmb.446).

Matsui et al., NP-completeness for calculating power indices of weighted majority games, Theoretical Computer Science 263 (2001) 305-310.

Strumbelj et al., An Efficient Explanation of Individual Classifications using Game Theory, Journal of Machine Learning Research 11 (2010) 1-18.

Rashmi et al., DART: Dropouts meet Multiple Additive Regression Trees, 2015, pp. 489-497.

Chen et al, XGBoost: A Scalable Tree Boosting System, 2016, 785-794.

Ribeiro et al, "Why Should I Trust You?" Explaining the Predictions of Any Classifier, 2016.

Ke et al., LightGBM: A Highly Efficient Gradient Boosting Decision Tree, 31st Conference on neural Inforamtion Processing Systems (NIPS 2017), 1-9.

Lundberg et al., Explainable machine-learning predictions for the prevention of hypoxaemia during surgery, Nat Biomed Eng. Oct. 2018; 2(10) 749-760.

(56) References Cited

OTHER PUBLICATIONS

Janzing et al., Feature relevance quantification in explainable AI: A causal problem, Proceedings of the 23rd International Conference on Artificial Intelligence and Statistics 2020., vol. 108.
Sundararajan et al., The Many Shapley Values for Model Explanation, Proceedings of the 37th International Conference on Machine Learning, Online, PMLR 119, 2020.
Lundberg, Scott, Explainable AI for Science and Medicine; slides from YouTube presentation, May 21, 2019, available at https://www.youtube.com/watch?v= B-c8tlgchu0.
Data Presentation How to cite Plotly, 2015 citation, citation formats retrieved from citebay.com/how-to-cite/plotly/Aug. 23, 2022.
Molnar, Christoph, Interpretable Machine Learning, A Guide for Making Black Box Models Explainable, Creative Commons Attribution-NonCommercial-ShareAlike 4.0 International License, Feb. 21, 2019.
Interpreting random forests, Diving into data, A blog on machine learning, data mining and visualization, Oct. 19, 2014.
Gall, Richard, Machine Learning Explainability vs Interpretability: Two concepts that could help restore trust in AI, 2018 retrieved from https://www.kdnuggets.com/2018/12/machine-learning-explainability-interpretability-ai.html.
Virtanen et al., SciPy 1.0: nature methods, Perspective, fundamental algorithms for scientific computing in Python, vol. 17, Mar. 2020, 261-272.
Kozyrkov, Cassie, What's the difference between analytics and statistics? Google on Sep. 6, 2019 in Analytics, Explained, Statistics, retrieved from https://www.kdnuggets.com/2019/09/difference-analytics-statistics.html.
Office Action from U.S. Appl. No. 16/708,605, dated Aug. 16, 2022.
Office Action for U.S. Appl. No. 17/172,472 dated Jun. 28, 2022, 26 pages.
E. Cuthill and J. McKee, Reducing the bandwidth of sparse symmetric matrices, ACM '69: Proceedings of the 1969 24th national conference, Aug. 1969, pp. 157-172.
Rodriguez-Perez Raquel et al.: "Interpretation of machine learning models using shapley values: application to compound potency and multi-target activity predictions" Journal of Computer-Aided Molecular Design, Springer Netherlands, NL, vol. 34, No. 10, May 2, 2020 (May 2, 2020), pp. 1013-1026, XP037228335, ISSN: 0920-654X, DOI: 10.1007/S10822-020-00314-0 [retrieved on May 2, 2020] * the whole document *.
Rohit Saluja et al: "Towards a Rigorous Evaluation of Explainability for Multivariate Time Series", arxiv.org, Cornell University Library, 201 Olin Library Cornell University Ithaca, NY 14853, Apr. 6, 2021 (Apr. 6, 2021), XP081936276, * the whole document *.
European Search Report from EP Application No. EP 22 18 5033, dated Nov. 24, 2022.
Qu et al., Multilevel Pattern Mining Architecture for Automatic Network Monitoring in Heterogeneous Wireless Communication Networks, Jun. 2016, China communications 13, No. 7: 108-116,Sep. 2, 2016.
Wang et al., An Algorithm for Mining of Association Rules for the Information Communication Network Alarms Based on Swarm Intelligence, Hindawi Publishing Corporation, Mathematical Problems in Engineering, vol. 2014, Article ID 894205, 14 pages, Jan. 1, 2014 [Online], [retrieved on Feb. 12, 2021] Retrieved from the Internet <URL: https://www.hindawi.com/journals/mpe/2014/894205/abs/>.
Brauckhoff et al.,Anomaly extraction in backbone networks using association rules, Proceedings of the 9th ACM SIGCOMM conference on Internet measurement, pp. 28-34, Nov. 4, 2009, [Online], [retrieved on Feb. 12, 2021], Retrieved from the Internet <URL: https://hal.archives-ouvertes.fr/hal-00527139/document >.
Agrawal et al.,Mining association rules between sets of items in large databases, May 1993,In Proceedings of the 1993 ACM SIGMOD international conference on Management of data (SIGMOD '93). Association for Computing Machinery, New York, NY, USA, 207-216. [Online], [retrieved on Feb. 12, 2021], Retrieved from the Internet <URL: https://doi.org/10.1145/170035.170072>.
Azevedo et al., Comparing Rule Measures for Predictive Association Rules, In Machine Learning: ECML 2007, [Online], [retrieved on Feb. 2, 2021], Retrieved from the Internet <URL: https://doi.org/10.1007/978-3-540-74958-5_47>.
Van Melle et al., Rule-based expert systems: the EMYCIN experiments of the Stanford Heuristic Programming Project, Chapter 15, EMYCIN: A knowledge Engineer's Tool for Constructing Rule-Based Expert Systems, 1984, CUMINCAD. Addison Wesley, Reading, MA.
Chen et al., Failure Diagnosis Using Decision Trees, May 2004, In International Conference on Autonomic Computing, 2004. Proceedings. IEEE, 36-43 New York, NY, USA.
M. Demetgul, Fault diagnosis on production systems with support vector machine and decision trees algorithms, 2013, The International Journal of Advanced Manufacturing Technology 67, 9-12 (2013), 2183-2194. ISBN: 0268-3768, Springer Verlag. Nov. 23, 2012.
Gardner et al., Alarm correlation and network fault resolution using the Kohonen self-organising map., GLOBECOM 1997. IEEE Global Telecommunications Conference. Conference Record, vol. 3. IEEE, 1398-1402. IEEE, Phoenix, AZ.
Han et al., Mining Frequent Patterns without Candidate Generation: A Frequent-Pattern Tree Approach. Data Mining and Knowledge Discovery 8, 1 (Jan. 2004), 53-87.,[Online], [retrieved on Feb. 2, 2021], Retrieved from the Internet <URL: https://doi.org/10.1023/B:DAMI.0000005258.31418.83>.
Leskovec et al., Mining of Massive Datasets (2nd ed.), 2014, Cambridge University Press, USA.
Lin et al., Fast Dimensional Analysis for Root Cause Investigation in a Large-Scale Service Environment, Proceedings of the ACM on Measurement and Analysis of Computing Systems 4, 2 (Jun. 2020), 1-23., arXiv: 1911.01225 version: 2. [Online], [retrieved on Feb. 2, 2021] Retrieved from the Internet <URL: https://doi.org/10.1145/3392149>.
Perri et al. Abductive logic programs with penalization: semantics, complexity and implementation, arXiv preprint cs/0310047 (2003). Theory and Practice of Logic Programming 5, 1-2 (2003), 123-159.
Sampath et al. Failure diagnosis using discrete-event models. IEEE transactions on control systems technology 4, 2 (1996), 105-124. ISBN: 1063-6536 Publisher: IEEE.
Tan et al., Introduction to Data Mining, (First Edition). Addison-Wesley Longman Publishing Co., Inc., USA. A fault analysis framework for cellular networks using scalable association rule mining KDD '21, Aug. 14-18, 2021, Singapore, NY.
Hermann Wietgrefe, Investigation and practical assessment of alarm correlation methods for the use in GSM access networks, NOMS 2002. IEEE/IFIP Network Operations and Management Symposium. 'Management Solutions for the New Communications World'(Cat. No. 02CH37327). IEEE, 391-403. ). IEEE, Florence, Italy.
Ye et al., Board-level functional fault diagnosis using multikernel support vector machines and incremental learning. IEEE Transactions on Computer-Aided Design of Integrated Circuits and Systems 33, 2 (2014), 279-290. ISBN: 0278-0070 Publisher: IEEE.
Zawawy et al., Requirements-driven root cause analysis using Markov logic networks. In International Conference on Advanced Information Systems Engineering. CAiSE 2012, LNCS 7328, pp. 350-365, 2012, Springer-Verlag Berlin Heidelberg 2012.
Brin et al., Dynamic Itemset Counting and Implication Rules for Market Basket Data. SIGMOD 1997 Arizona USA, Rec. 26, 2 (Jun. 1997), 255-264.
Alzira Faria, A Methodology for Filtering Association Rules. Revista de Ciências da Computação II, 2 (Jan. 2007), 14-25.
Alipio Jorge, Hierarchical Clustering for thematic browsing and summarization of large sets of Association Rules, 2004 SIAM International Conference on Data Mining, Orlando, Florida.
Shvachko et al., The hadoop distributed file system. In Symposium on mass storage systems and technologies (MSST). IEEE, Incline Village, NV, USA, 1-10, 2010.

(56) References Cited

OTHER PUBLICATIONS

Zaharia et al., Spark: Cluster computing with working sets. In Proceedings of the 2nd USENIX Conference on Hot Topics in Cloud Computing (HotCloud'10), vol. 10. USENIX Association, USA, 2010.

Toivonen et al., Pruning and Grouping Discovered Association Rules,1995, Department of computer Science, University of Helsinki, Finland.

Tan et al., Selecting the right objective measure for association analysis. Information Systems 29, 4 (2004), 293-313., Elsevier, Department of Computer Science, University of Minnesota, 200 Union Street SE, Minneapolis, MN 55455, USA.

Mdini et al., ARCD: a Solution for Root Cause Diagnosis in Mobile Networks. 14th International Conference on Network and Service Management (CNSM), Nov. 2018, Roma, Italy. hal-01962869.

Mdini, Create your own Artificial Intelligence to monitor your Linux System! Europython, Edinburgh Jul. 23-29, 2018.

Mdini et al., Monitoring the Network Monitoring System: Anomaly Detection using Pattern Recognition, May 2017, IMT Atlantique, Astellia, France.

Palacios et al., Automatic feature selection technique for next generation self-organizing networks, IEEE Communications Letters, vol. 22, No. 6, Jun. 2018.

Monge et al. Reasoning and knowledge acquisition framework for 5G network analytics, Oct. 21, 2017, Sensors.

E. J. Khatib, Data analytics and knowledge discovery for root cause analysis in LTE self-organizing networks, PhD dissertation, 2017, University of Malaga.

Munoz et al., A method for identifying faulty cells using a classification tree-based UE diagnosis in LTE, 2017, 2017:130, DOI 10.1186/s13638-017-0914-3, EURASIP Journal on Wireless Communications and Networking.

Klaine et al., A Survey of Machine Learning Techniques Applied to Self-Organizing Cellular Networks, Jul. 12, 2017, doi:10.1109/COMST.2017.2727878, IEEE Communications Surveys and Tutorials.

Liu et al., GA-AdaBoostSVM classifier empowered wireless network diagnosis, 2018, 2018:77, EURASIP Journal on Wireless Communications and Networking.

Moysen et al., A Reinforcement Learning based solution for Self-Healing in LTE networks, 2014, 978-1-4799-4449-1/14, IEEE.

Gogoi et al., Efficient Rule Set Generation using Rough Set Theory for Classification of High Dimensional Data, 2011 International Journal of Smart Sensors and Ad Hoc Networks (IJSSAN) ISSN No. 2248-9738 (Print) vol. 1, Issue-2.

3GPP, 3rd Generation Partnership Project;Technical Specification Group Services and System Aspects; Telecommunication management; Charging management; Charging Data Record (CDR) parameter description (Release 15), Dec. 2018, TS 32.298 V15.5.1.

Leifler, Comparison of LEM2 and a Dynamic Reduct Classification Algorithm, Masters Thesis, Oct. 9, 2002, LiTH-IDA-EX-02-93, Artificial Intelligence & Integrated Computer Systems Division, Dept. of Computer and Information Science, Linkopings universitet.

Fortes et al., Location-based distributed sleeping cell detection and root cause analysis for 5G ultra-dense networks, 2016, 2016:149, DOI 10.1186/s13638-016-0649-6, EURASIP Journal on Wireless Communications and Networking.

Hanemann, A Hybrid Rule-Based/Case-Based Reasoning Approach for Service Fault Diagnosis, available on May 23, 2019, Leibniz Supercomputing Center, Munich, Germany.

Zheng et al., 3-Dimensional Root Cause Diagnosis via Co-analysis, Sep. 18-20, 2012, ACM 978-1-4503-1520-3/12/09, San Jose, USA.

Mahimkar et al, Towards Automated Performance Diagnosis in a Large IPTV Network, Aug. 17-21, 2009, ACM 978-1-60558-594-9/09/08, Barcelona, Spain.

Dimopoulos et al., Identifying the Root Cause of Video Streaming Issues on Mobile Devices, Dec. 1-4, 2015, DOI: 10.1145/2716281.2836109, Heidelberg, Germany.

Mahimkar et al., Rapid Detection of Maintenance Induced Changes in Service Performance, Dec. 6-9, 2011, ACM 978-1-4503-1041-3/11/0012, Tokyo, Japan.

Nagaraj et al., Structured Comparative Analysis of Systems Logs to Diagnose Performance Problems, available May 23, 2019, Purdue University.

Steinder et al., A survey of fault localization techniques in computer networks, Jul. 1, 2014, Science of Computer Programming 53 (2004) 165-194, United States.

Khatib et al., Data mining for fuzzy diagnosis systems in LTE networks, Jun. 1, 2015, Expert Systems with Applications 42 (2015) 7549-7559, Elsevier Ltd., Spain.

Palacios et al., Combination of multiple diagnosis systems in Self-Healing networks, Jul. 22, 2016, Expert Systems With Applications 64 (2016) 56-68, Elsevier Ltd., Spain.

Fortes et al., Contextualized indicators for online failure diagnosis in cellular networks, Apr. 4, 2015, Computer Networks 82 (2015) 96-113, Elsevier B.V., Spain.

Jin et al., Nevermind, the Problem Is Already Fixed: Proactively Detecting and Troubleshooting Customer DSL Problems, Nov. 30-Dec. 3, 2010, ACM 1-4503-0448-1/10/11, Philadelphia, USA.

Zhang et al, On Assuring End-to-End QoE in Next Generation Networks: Challenges and a Possible Solution, Jul. 2011, 0163-6804/10, IEEE Communications Magazine.

Ong et al., A Manufacturing Failure Root Cause Analysis in Imbalance Data Set Using PCA Weighted Association Rule Mining, Aug. 11, 2015, Penerbit UTM Press, Melaka, Malaysia.

Mi et al., Toward Fine-Grained, Unsupervised, Scalable Performance Diagnosis for Production Cloud Computing Systems, Jun. 2013, IEEE Transactions on Parallel and Distributed Systems, vol. 24, No. 6, DOI: 10.1109/TPDS.2013.21, IEEE Computer Society.

Mahapatro et al., Fault Diagnosis in Wireless Sensor Networks: A Survey, 2013, IEEE Communications Surveys & Tutorials, vol. 15, No. 4, DOI: 10.1109/SURV.2013.030713.00062, IEEE.

Gomez-Andrades et al., Automatic Root Cause Analysis for LTE Networks Based on Unsupervised Techniques, Apr. 2016, IEEE Transactions on Vehicular Technology, vol. 65, No. 4, DOI: 10.1109/TVT.2015.2431742, IEEE.

Fortes et al., Context-Aware Self-Healing: User Equipment as the Main Source of Information for Small-Cell Indoor Networks, Feb. 24, 2016, IEEE vehicular technology magazine, DOI: 10.1109/MVT.2015.2479657, IEEE.

Xu et al., Industrial Big Data for Fault Diagnosis: Taxonomy, Review, and Applications, Sep. 19, 2017, IEEE Access, vol. 5, DOI: 10.1109/ACCESS.2017.2731945, IEEE.

Imran et al., Challenges in 5G: How to Empower SON with Big Data for Enabling 5G, Nov./Dec. 2014, IEEE Network, IEEE.

Mdini et al., Introducing an Unsupervised Automated Solution for Root Cause Diagnosis in Mobile Networks, 2019, IEEE, Transactions on Network and Service Management DOI: 10.1109/TNSM.2019.2954340, IEEE.

Mdini, Anomaly detection and root cause diagnosis in cellular networks. Artificial Intelligence [cs.AI]. Ecole nationale supérieure Mines-Télécom Atlantique, 2019. English. NNT : 2019IMTA0144. tel-02304602.

Decker et al., Classification in Marketing Research by Means of LEM2-generated Rules, 2007, Department of Business Administration and Economics, Bielefeld University, Germany.

Non-final office action dated Apr. 19, 2022 for U.S. Appl. No. 16/708,605, 26 pages.

Notice of Allowance and Fee(s) Due, U.S. Appl. No. 16/669,033, dated Jul. 30, 2021, 9 pages.

European Patent Office, Extended European Search Report for European patent application EP21159936, dated May 28, 2021 (7 pages).

Maha Mdini, Gwendal Simon, Alberto Blanc, and Julien Lecoeuvre, Introducing an Unsupervised Automated Solution for Root Cause Diagnosis in Mobile Networks, IEEE Transactions on Network and Service Management, vol. 17, No. 1, Mar. 2020.

Maha Mdini, Anomaly detection and root cause diagnosis in cellular networks, Artificial Intelligence [cs.AI], Ecole nationale superieure Mines-Telecom Atlantique, Oct. 2019, available at https://tel.archives-ouvertes.fr/tel-02304602.

(56) References Cited

OTHER PUBLICATIONS

Extended European search report dated Apr. 29, 2020 for European Application No. 19206600.9, 7 pages.
Extended European Search Report dated May 20, 2020, issued in corresponding European Patent Application No. 19205083.9, 13 pages.
Cuthill E. and McKee J., Reducing the Bandwidth of Sparse Symmetric Matrices, Naval Ship Research and Development Center, Washington.
Dranab Ghosh, "lime Series Seasonal Cycle Detection with Auto Correlation on Spark" retrieved from: hllps:// kghosh.wordpress.com/2018/12/23/lime-series-seasonal-cycle-detection-with-auto-correlation-on-spark/.
Han J. and Kamber M. Data Mining Concepts and Techniques (second edition), 2006 by Elsevier Inc.
Liu aet al. Integrating Classification and Association Rule Mining, From: KDD-98 Proceedings. Copyright © 1998, American Association for Artificial Intelligence (www.aaai.org). Department of Information Systems and Computer Science National University of Singapore.
M. Mdini, A. Blanc, G. Simon, J. Barotin and J. Lecoeuvre, "Monitoring the network monitoring system: Anomaly Detection using pattern recognition," 2017 IFIP/IEEE Symposium on Integrated Network and Service Management IM), Lisbon, 2017, pp. 983-986.
Maimon, 0 and Rokach L. Data Mining and Knowledge Discovery Handbook (second edition) Springer Science +Business Media, LLC 2005, 2010. DOI 10.1007/978-0-387-09823-4.
Mdini M., Root Cause Diagnosis, Nov. 22, 2017, Astellia.
Mdini, Maha, Monitoring the Network Monitoring System: Anomaly Detection using Pattern Recognition, Cellular Networks Feb. 22, 2017.
Reali G. and Monacelli L., Definition and Performance Evaluation of a Fault Localization Technique for an NGN IMS Network, IEEE Transactions on Neiwork and Service Management, vol. 6, No. 2, Jun. 2009. DOI 10.1109/TNSM.2009.090605. Downloaded on Jan. 31, 2022 at 20:51:52 UTC from IEEE Xplore.
Tan et al., Introduction to Data Mining, Pearson New International Edition (First Edition). Pearson Education Limited 2014 ISBN 10: 1-292-02615-4 ISBN 13: 978-1-292-02615-2.
Van Melle W., Rule-based expert systems: the Mycin experiments of the Stanford Heuristic Programming Project, Chapter 4, The Structure of the Mycin System, 1984, CUMINCAD. Addison Wesley, Reading, MA.
H. Phan-Vu, B. Jaumard, T. Glatard, J. Whatley and S. Nadeau, "A Scalable Multi-factor Fault Analysis Framework for Information Systems," in 2021 IEEE International Conference on Big Data (Big Data), Orlando, FL, USA, 2021 pp. 2621-2630. doi: 10.1109/BigData52589.2021.9671747.
Kam Rupesh Raj et al., Dynamic Autoselection and Autotuning of Machine Learning Models for Cloud Network Analytics, DOI 10.1109/TPDS.2018.2876844, IEEE Transactions on Parallel and Distributed Systems, vol. 30, Issue 5, May 1, 2019, pp. 1052-1064, Oct. 19, 2018.

\* cited by examiner

AUTOMATIC ROOT CAUSE DIAGNOSIS IN NETWORKS

CROSS-REFERENCE TO RELATED APPLICATIONS

This application is a divisional of and claims priority to U.S. patent application Ser. No. 16/659,874, filed Oct. 22, 2019.

U.S. patent application Ser. No. 16/659,874 claims priority to European Patent App. No. 18306435.1, filed Oct. 31, 2018, U.S. Provisional Patent App. No. 62/830,633, filed Apr. 8, 2019, U.S. Provisional Patent App. No. 62/854,649, filed May 31, 2019, and U.S. Provisional Patent App. No. 62/881,457, filed Aug. 1, 2019.

All of these priority applications are hereby incorporated by reference in their entirety.

BACKGROUND

Cellular networks have become more complex over the years, with multiple co-existing Radio Access Technologies (RATs) (such as 2G, 3G, and 4G), multiple core network devices from various vendors, multiple services that go beyond the regular telephony, and multiple handsets running various Operating Systems (OSs). This growing complexity makes the task of supervising the network and identifying the cause of performance degradation more challenging for the network operators.

The deployment of a monitoring system aims to provide an accurate status of the network behavior in real time by generating logs, such as Call Data Records (CDRs) or Session Data Records (SDRs), of activities occurring in the network. Then, the flow of logs is generally pre-processed before being scrutinized using ad-hoc tools, which are often time consuming and inefficient. Network operators would like to increase the efficacy of this analysis, in particular for cellular networks, in order to reduce the time needed to detect and fix performance issues and to identify more complicated problems that are not always detectable manually or detected by current techniques.

SUMMARY

The data that is generated by a monitoring system can include a large number of log entries (or simply logs), each of them being the report of what happened during a communication session. The type of log depends on the specific service: a Call Data Record (CDR) for a regular phone call or a Session Data Record (SDR) for a service based on the Internet Protocol (IP). A log usually takes on the form of a series of 2-tuples (feature; value). The "feature" describes the type of information that is measured (for example cell identifier—cell ID, content provider, handset manufacturer), while the "value" is what has been collected for this particular session (in examples, a number that enables one to uniquely identify the cell, the name of a provider, and the name of a manufacturer). The root cause of a network malfunction can be either a certain 2-tuple, or a combination of k 2-tuples. A network monitoring system may collect these 2-tuples from various devices in a radio or core network to obtain or produce CDRs and SDRs.

Identifying the root cause of problems in modern cellular networks is still an open research question due to specific requirements related to the nature of this type of network. First, a diagnosis system should work on various types of logs (e.g., from voice calls, data, and multimedia sessions) because, today, cellular networks carry significant amounts of data traffic as well as voice. Second, a diagnosis solution should work with the increasing number of features. Logs can include features related to the service (e.g. the content provider, the quality and priority classes), the network (e.g. the RAT and the involved gateways), and/or the user (e.g. the handset type and the handset manufacturer). Furthermore, these features can depend on each other due to the architecture of network and services. Third, a diagnosis solution should address the complex interplay between features—for example, an OS version not supporting a particular service. Both the service and the OS can behave normally in a majority of sessions when scrutinized independently; however, the issue might only be diagnosed in logs containing both. Finally, the diagnosis solution should focus on problems that have an actual impact on the network performance. A problem that happens sporadically in a device that is used by millions of users can have a greater importance than a problem that occurs regularly in a device used by only hundreds of users. The balance between number of occurrences and inefficiency is a matter of prioritizing mitigation actions.

Amongst automatic root cause diagnosis solutions, one can distinguish two main approaches. These are whether the diagnosis is implemented by scrutinizing one feature in particular, or by using dependency analysis.

Some researchers consider each feature in isolation, e.g., handset type, cell ID, service, applying statistical inference, machine learning techniques, or expert rules to identify the elements causing network inefficiency. Such methodologies include using an unsupervised technique based on Self Organizing Maps and Hierarchical Clustering to identify the cells responsible for network inefficiency, applying a Bayes Classifier together with expert rules to identify radio inefficiency root causes in ultra-dense networks, and combining different classification algorithms to create a hybrid system for determining problematic cells which is more reliable but also more complex. Another technique involves applying fuzzy Data Mining techniques to Long Term Evolution (LTE) Key Performance Indicators (KPIs) to generate association rules. This approach focuses mainly on radio issues related to cells. Being a supervised method, it aims to only detect predefined issues.

Other studies have an end-to-end view of the network but only consider one feature at a time. Such an approach has also been explored in other contexts than networks, such as performing rough root cause location on High Performance Computing (HPC) systems based on software logs and classifying issues into three categories of failures: hardware, software, and application. Other proposals include a context-aware analysis based on the Naïve Bayes method applied to KPIs. The additional information of the context depends on the feature. This type of analysis can be conducted through the whole network feature by feature. Further, Robust Principal Component Analysis (RPCA) can be applied to Cloud Computing logs to detect performance anomalies. The anomalous methods and replicas are identified based on the execution time.

The diagnosis based on an isolated feature approach, while accurate, understandable and manageable by end users (since it compares elements of the same feature with one another), has its limits, as it does not take into account the dependencies between features. For example, the cells connected to a low performing Base Station Controller (BSC) may appear as inefficient. The approaches based on considering one feature at a time also have the limitation of ignoring all the problems caused by more than one feature, such as incompatibilities and causal effects. These induced effects cannot be detected unless one uses dependency analysis.

Some research has focused on hierarchical dependencies resulting from the topology of the network, e.g., the content providers of a misconfigured service not having their content delivered. To identify such dependencies, the topology of the network as defined by experts is manually integrated in the solution. Some approaches combine multiple classifiers to rank the locations of the issues. Then, they exploit the topology of the wired access network to explain the dependencies between the problems. Additional techniques monitor KPIs to identify the most inefficient elements in the network, and then explore the higher-level elements in the topological graph of the network to identify the elements impacted by the same problem. Some research, applied to the specific case of IP Television (IPTV) networks, relied on the same approach using more advanced statistical calculations.

By relying on network topology to identify dependencies, one may miss some relevant occasional dependencies resulting from co-occurrence or coincidence. One example of such a situation is a group of cell phone roaming users (tourists) accessing the same cell. These dependencies are not predictable. To explore both hierarchical and occasional dependencies, different statistical methods have been proposed. Some use Principal Component Analysis (PCA) applied to non-numerical data to create weighted association rules. While this approach can find incompatibilities, it does not deal efficiently with induced effects related to hierarchical dependencies. There may be multiple association rules pointing to the same problem with no information about the causal effect.

One possible solution is to use decision trees to create a graph of dependencies. This method requires a database with already solved cases. Furthermore, creating decision trees is accurate and computationally efficient only when dealing with a few features. In a similar context, an unsupervised approach was proposed to diagnose distributed systems. They apply the T-test to event logs to identify major events-related inefficiencies. Then, they troubleshoot the locations affected by these events. If several of the relevant features are non-numerical, one cannot however apply the T-test.

These approaches, while addressing some of the challenges related to root cause analysis, do not meet all the requirements of a complete diagnosis system in practice. First, the dependencies are set manually, which represents a significant overhead in the case of large networks. Second, the aforementioned statistical tools cannot apply on a vast set of features (more than hundred in national LTE networks), a majority of them being non-numerical. Finally, the existing techniques only address a subset of the challenges.

For example, one proposal identifies problems on a mobile telecommunications network. A stream of detail records (referred to as xDRs, which may include both CDRs and SDRs) from the telecommunications network is monitored for an increase in the number of users of the network affected by particular problems as identified by a respective error code. If such an increase is detected for a particular problem, one then analyses the xDRs that are related to that particular problem. More specifically, a set of predefined fields within the xDRs is scanned. In the scan, one determines, for each field of the set, to what extent the same field value is shared across the different xDRs. If the same field value is shared across a minimum number of xDRs, this field value is identified as a root cause for the particular problem. As an example, one field of the set might correspond to handset type, and a value of this field might a particular brand and/or model is mobile phone.

The drawback of this method is that it is prone to yielding false positives as root causes. If a field value is shared by faulty xDRs, this does not necessarily imply that it is the root cause of the issue. Furthermore, this method relies on the compilation and maintenance by experts of thousands of error codes. The method is unable to detect and analyze errors in the network that have not been previously assigned an error code.

The embodiments herein provide a method of identifying root causes of communication failures in a telecommunications network that is more versatile and precise than previous techniques. This method may involve: (i) obtaining a set of data records, the set characterizing communication activity on a network, each data record containing technical metadata about one communication session initiated within the network, the metadata including the identities of entities involved in the communication session; (ii) obtaining a binary label for each data record, said binary label classifying the communication session associated with the data record as a successful session if the session's Quality of Service (QoS) is acceptable as indicated by a predetermined metric, and as a failed session if the session's QoS is unacceptable as indicated by said predetermined metric; (iii) computing, for each of a plurality of entity identities or of entity identity pairs of the telecommunications network, a problem indicator indicating to what extent the entity identity or entity identity pair is involved in communications problems within the network; (iv) using the computed problem indicators to identify those significant entity identities among the plurality of entity identities or those significant entity identity pairs among the plurality of entity identity pairs that are significantly involved in communications problems within the telecommunications network; (v) compiling the significant entity identities or significant entity identity pairs into a top involvement list; (vi) identifying mutual and/or hierarchical dependencies between the entity identities or entity identity pairs in the top involvement list; (vii) organizing the entity identities or entity identity pairs in the top involvement list according to the identified dependencies; and (viii) deducing probable root causes of communication failures from the organized entity identities or entity identity pairs.

By performing a dependency analysis and organizing the most involved entities according to dependencies, it becomes possible to discard false positives and identify the sources of communication failures in a telecommunications network. Thanks to this, accurate information is available for taking appropriate corrective action.

These embodiments introduce a new and innovative technique, referred to herein as Automatic Root Cause Diagnosis (ARCD), to locate the root cause of network inefficiency. ARCD identifies the major contributors to the network performance degradation with respect to the requirements of modern cellular networks. An evaluation is included for ARCD when implemented in real conditions with three different cellular network operators. The results show that with an unsupervised solution, one can go to a finer level of diagnosis than previous techniques and point to the root causes of issues with high precision. An advantage of ARCD is to bridge the gap between the rapidly growing cellular networks and the traditional troubleshooting methods.

Accordingly, a first example embodiment may involve obtaining a set of data records, wherein the data records include respective pluralities of tuples characterizing operation of communication sessions in a network, wherein the tuples contain signatures representing features and values, wherein the features and values identify hardware or software components related to the network that were involved in the communication sessions. The first example embodiment may also involve generating binary labels for the data records, wherein the binary labels respectively indicate whether the communication sessions associated with the data records were successful or failed. The first example embodiment may also involve determining degrees to which signatures in the pluralities of tuples are associated with communication problems in the network, wherein, for a particular signature, a degree is based on linear combinations of: (i) a proportion of the data records not including the signature, and (ii) a proportion of the data records labelled as failed that do not include the signature. The first example embodiment may also involve identifying, from the degrees, a subset of the signatures most associated with the communication problems. The first example embodiment may also involve grouping specific pairs from the subset of the signatures into equivalence classes based on co-occurrence of signatures of the specific pairs within the data records. The first example embodiment may also involve generating a dependency graph between the equivalence classes in which the equivalence classes are represented as nodes in the dependency graph and edges are placed between a parent equivalence class and a child equivalence class where the data records in the child equivalence class are approximately a subset of the data records in the parent equivalence class. The first example embodiment may also involve, based on the signatures and the binary labels, determining relative failure ratios of each of the child equivalence classes with respect to their parent equivalence classes. The first example embodiment may also involve removing parent or child equivalence classes from the dependency graph where all of the relative failure ratios thereof are less than a pre-determined threshold. The first example embodiment may also involve, from the equivalence classes remaining in the dependency graph, selecting a subset of the hardware or software components related to the network that are candidates for involvement with the communication problems.

A second example embodiment may involve obtaining a set of data records, wherein the data records include respective pluralities of tuples characterizing operation of communication sessions in a network, wherein the tuples contain signatures representing features and values, wherein the features and values identify hardware or software components related to the network that were involved in the communication sessions. The second example embodiment may also involve determining a 2-signature tuple present in at least one of the data records, wherein the 2-signature tuple is composed of a first signature and a second signature. The second example embodiment may also involve calculating, for the 2-signature tuple, a first gain representing an overall relative inefficiency of the communication sessions involving the 2-signature tuple compared to relative inefficiencies of the communication sessions involving the first signature or the second signature. The second example embodiment may also involve determining that the first gain exceeds a first pre-determined threshold. The second example embodiment may also involve, based on determining that the first gain exceeds the first pre-determined threshold, (i) filtering the communication sessions involving the 2-signature tuple to create a subset of the communication sessions involving 1-signatures for which a size of the subset exceeds a second pre-determined threshold, and (ii) calculating a second gain representing the overall relative inefficiency of the communication sessions involving the 2-signature tuple compared to relative inefficiencies of the communication sessions involving the 1-signatures for which the size of the subset exceeds the second pre-determined threshold. The second example embodiment may also involve determining that the second gain exceeds the first pre-determined threshold. The second example embodiment may also involve based on determining that the second gain exceeds the first pre-determined threshold, identifying the features and values that are represented by the first signature and the second signature as units of the hardware or software components that are incompatible.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Example methods, devices, and systems are described herein. It should be understood that the words "example"

and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. DATA MODEL AND NOTATION

With the growth of cellular networks, supervision and troubleshooting tasks have become troublesome. The present disclosure specifies a root cause diagnosis framework that identifies the major contributors (devices, services, user groups) to a network's overall inefficiency and incompatible devices and services, classifies these into groups and explores the dependencies between the different groups. Telecommunication experts are provided with a graph summing up the fault locations and their potential dependencies that helps them trigger the adequate maintenance operation. Alternatively, this maintenance could be automatically triggered.

Figure 1:
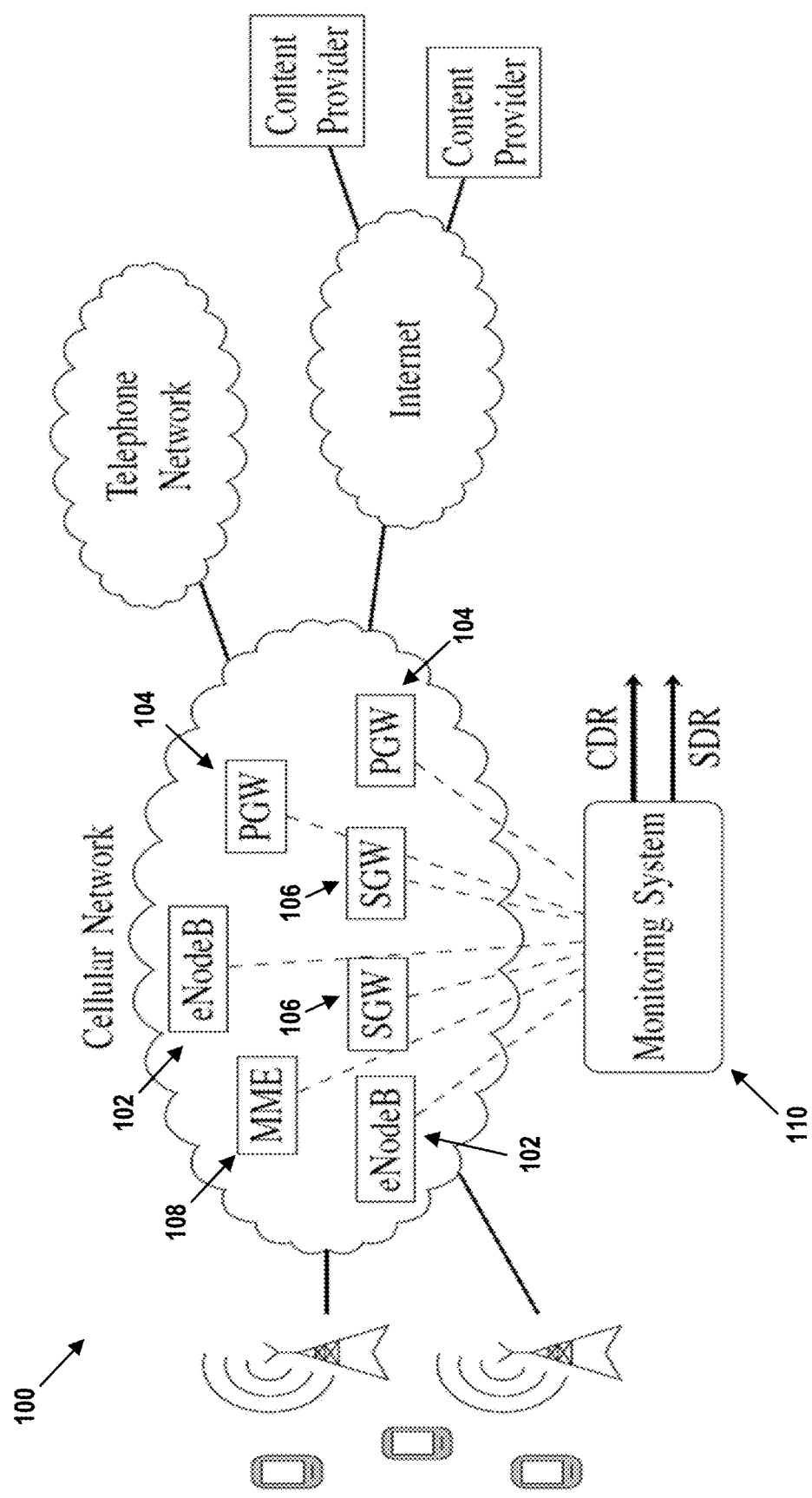
FIG. 1 is a simplified view of an LTE cellular network, in accordance with example embodiments.

FIG. 1 shows a simplified view of the system architecture 100 on an LTE cellular network, including some of its monitored elements (Evolved Node B—eNodeB 102, packet data network Gateway—PGW 104, Serving Gateway—SGW 106, and Mobility Management Entity—MME 108) and the corresponding monitoring system 110, which collects data from the different devices to produce the CDRs and SDRs.

These data records are collected by the network operators to report mobile communications that are established using the network. A data record contains the technical details of a mobile communication without including its content. In other words, a data record includes technical metadata about one or more communication sessions initiated within the network. Thus, each data record may aggregate information collected at the interfaces between the network and the monitoring systems.

A data record can also be called a log or may be part of a log. A log is a series of 2-tuples (feature, value) where the features can be service related, network related, or user related. Service related features may be service type, Mobile Network Code (MNC), content provider, or QoS Class Identifier (QCI) for example. Network related features may indicate a RAT, MME, Radio Network Controller (RNC), or cell for example. User related features may include an International Mobile Subscriber Identity (IMSI), handset manufacturer, or handset type, for example.

TABLE 1

Example logs.

| xDR # | first_cell | imsi | tac | service | interface | label |
|---|---|---|---|---|---|---|
| 0 | a3d2 | 97c8 | c567 | ea52 | eccb | failed |
| 1 | b37a | 56ed | ce31 | ea52 | 19c4 | successful |
| 2 | a3d2 | fa3e | c41e | c98e | f487 | successful |

In a log, every feature may be associated with a value. Three logs are shown in Table 1. As can be seen here, logs from the same cell (logs 0 and 2) or from the same service (0 and 1) can be tracked. The features in the logs can also be called entities of the network. Indeed, each feature corresponds to a certain type of element having a specific function within the network. One entity thus corresponds to one class of elements present in the network. One example of a feature or entity is the IMSI. Another example of an entity is the handset type. Yet another example of an entity is the application type. Accordingly, an entity can be any type of actor participating in the network, be it hardware (e.g. a network cell), software (e.g. an application running on a mobile terminal), a natural person (e.g. a subscriber), a legal person (e.g. a content provider), or any other actor.

In each log or data record, each entity (where a feature may be an entity) is associated with one value within a predefined set of values. In the present disclosure, these values are also called identities. For a specific data record, the values therein specify the exact identity of the actor for each of the entities of the data record.

Looking for example at the log or data record 0 in Table 1, the first cell "a3d2", the IMSI "97c8", the TAC "c567", the service "ea52" and the interface "eccb" were all involved in the corresponding communication session. The identity is thus an identifier, which may e.g. stand for a subscriber of the network, a specific application being used in the network, such as a social networking site or a video streaming site, or a specific handset type that is used in the network, such as a SAMSUNG GALAXY® S8 or an APPLE® IPHONE® 6. In the present disclosure, the term "entity" is an umbrella term specifying a certain class of actors, whereas the term "identity" stands for a specific value identifying one specific actor for a given class of actors, viz. for a given entity.

The label feature, which has a binary value, is either failed or successful. The label can be either a feature that is directly collected by the monitoring system, or it can be post-processed from the analysis of the values of the log. The label indicates whether the mobile communication was satisfactory or not.

In the embodiments herein, there are two types of data records, CDRs and SDRs. CDRs are the records of voice calls. Each time a subscriber attempts to make a call, a CDR is created. If the call is dropped, the CDR is labelled as failed. SDRs are the records created to track every Internet connection in cellular networks. An SDR is created each time a subscriber attempts to use an online mobile application. SDRs are often the summary of one or more Transmission Control Protocol (TCP) connections initiated by the mobile application. Unlike CDRs, SDRs are not labelled. However, it is possible to estimate the quality of experience (QoE) for the user and thus to deduce a label, typically from data rate, response time, and retransmission ratio. CDRs and SDRs can be collectively referred to as xDRs.

Let E be a set of logs and $f_1, f_2, \ldots f_n$ be the features of the logs. A log $x \in E$ can also be represented as a vector $x=(x_1, x_2, \ldots, x_n)$ where $x_i$ is the value of the feature $f_i$ as collected for x. E is distinguished in the set of logs that are labelled as being successful, noted S, and the set of logs that are labelled as failed, noted F. Since every log is labelled, $E = S \cup F$ and $S \cap F = \emptyset$.

To group the logs that have certain similarities, the notion of a signature is introduced. A signature may be equivalent to an identity. Thus, the terms "signature" and "identity" can be used interchangeably.

A k-signature s is restricted to k pre-determined features (entities) $\{f_{p_1}, f_{p_2}, \ldots, f_{p_k}\}$ where $1 \leq p_i \leq n$, $\forall i$, and for which the k values $\{s_{p_1}, s_{p_2}, \ldots, s_{p_k}\}$ are given. The parameter k is the order of the signature. For example, a 2-signature s that groups all logs issued from a given cell ab34 from mobile phone running an OS b4e8 can be represented as:

$$((firstcell, ab34), (handset\ os, b4e8))$$

A log $x \in E$ matches a signature s when $s_{p_i} = x_{p_i}$ $\forall i$. This is noted as $s \models x$. The subset of logs of a set E matching a signature s is denoted as $E(s) = \{x \in E | s \models x\}$. Similarly, the set of failed logs matching s is denoted as $F(s) = \{x \in F | s \models x\}$.

The following notation for the set of signatures is used. The operator $|\cdot|$ denotes the cardinality of a set. The signature proportion $\pi$ of a signature s is the proportion of logs matching s:

$$\pi(s) = \frac{|E(s)|}{|E|}$$

The complementary signature proportion $\bar{\pi}$ of a signature s is the proportion of logs that do not match s:

$$\bar{\pi}(s) = 1 - \pi(s)$$

The failure ratio $\lambda$ of a signature s is the proportion of failed logs among logs matching s:

$$\lambda(s) = \frac{|F(s)|}{|E(s)|}$$

The complementary failure ratio $\bar{\lambda}$ of a signature s is the proportion of failed logs in the data set without considering the logs matching s:

$$\bar{\lambda}(s) = \frac{|F| - |F(s)|}{|E| - |E(s)|}$$

II. EXAMPLE DIAGNOSTIC SYSTEM

An advantage of the present diagnostic system is its ability to pinpoint the major contributors to the overall inefficiency of a network. The inefficiency is extracted from the failed logs (in practice it is often directly computed from the ratio of failed logs but more sophisticated inefficiency KPIs are possible). The major contributors are elements (or combinations of elements) that are involved in communication. An element is a 2-tuple (feature, value). Network operators consider that a major contributor is an element such that, when all logs except those containing this element are considered, the overall inefficiency of the network decreases. Put another way, major contributors cause the network to be more inefficient. The present diagnostic system aims at identifying major contributors and incompatible elements in order to provide experts with sufficient information to troubleshoot the network. Several challenges make the implementation of diagnostic systems hard in practice.

First, some elements are highly inefficient (they fail often), however they do not appear in a large number of logs. For example, a subscriber can attempt to make a single call, which is dropped. The inefficiency of the IMSI of the subscriber is 1.0. However, it is calculated on only one log. This IMSI cannot be considered as a major contributor since its removal has little or no impact on the overall inefficiency.

Second, some elements appear in a statistically significant number of logs, have a high failure ratio, but their inefficiency is extrinsic. For example a RAN (a BSC in 3G networks) connected to four cells. The BSC is involved in a large number of calls. If three of its connected cells are faulty, there may be many failed logs containing this BSC, although this BSC runs properly.

Lastly, some elements appear in a high number of logs and have a high failure ratio, but they are not faulty. For example, if two adjacent cells work properly but have a low coverage area between them, there may be many drops in the calls starting from one cell and then handing over to the other. If the number of such calls is large, the wrong conclusion is that both cells are faulty. The challenge here is to identify the combination of the two cells as the root of the problem and not each one apart. Other examples of incompatible elements include an OS not supporting a service and a roaming issue occurring with a specific RAT. In general, incompatibilities are subtle issues and hard to identify.

The diagnosis system disclosed herein has two components. A first component detects major contributors. This component can run in real time or be triggered by an automatic anomaly detection system. It analyses the network and finds the main roots of the network overall inefficiency. A second component detects incompatibilities. This component can run on demand to verify the interoperability of different elements. It detects fine-grained and lower priority issues.

III. EXAMPLE MAJOR CONTRIBUTOR DETECTION

Figure 2:
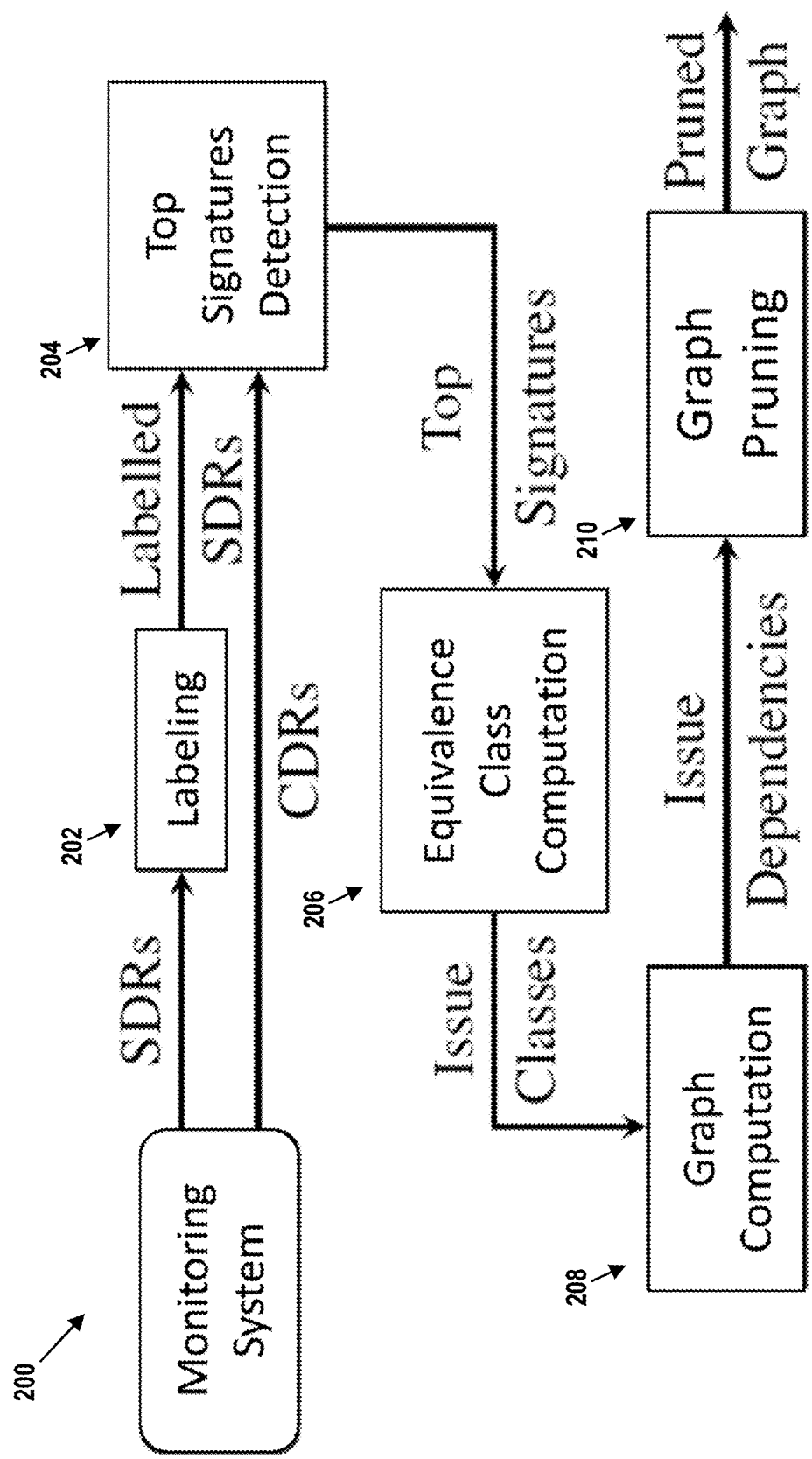
FIG. 2 is a flow chart depicting major contributor detection, in accordance with example embodiments.

The ARCD processing of data records to create a graph of dependencies between issues occurring within the network is now discussed. First, it labels the data if the logs are not already labelled. Then, it identifies the top signatures responsible for the network inefficiency. These signatures are then classified into equivalence classes, which are groups of signatures corresponding to the same problem. Then it generates a graph outlining the dependencies between all the problems. It finishes by pruning the graph to remove unnecessary nodes denoting false problems (elements appearing as inefficient because they share a part of their logs with malfunctioning ones). FIG. 2 gives a graphical representation 200 of these main example steps, which are detailed below.

A. Labelling

The first step 202 consists of labelling the logs. If the data has no success/failure label, a binary feature is created. In an example embodiment, the binary feature is based on standardized criteria specified by 3GPP. In the case of a CDR, a success/failure label is based on the Session Initiation Protocol (SIP) messages exchanged between devices. In the case of SDR, the QoS of TCP connections is assessed based on metrics such as mobile response time, server response time, and retransmission ratio (e.g., the ratio of retransmitted packets to the total number of packets in a session). For each metric, there is a lower bound for an acceptable QoS (e.g., 75 milliseconds for mobile response time, 50 milliseconds for server response time, and 0.02 for retransmission ratio though other values may be used). An SDR with at least one value that does not meet the threshold is labelled as failed.

B. Top Signature Detection

The second step 204 consists of identifying the top 1-signatures contributing to the overall inefficiency of the network. To do so, the set of all 1-signatures is generated. This is the set of all possible values taken by each one of the features. Then, for each signature, two values are computed: the complementary signature proportion $\bar{\pi}$ and the complementary failure ratio $\bar{\lambda}$. The 1-signatures with the smallest values of $\bar{\lambda}$ correspond to the "major contributors." Removing all the logs belonging to these signatures results in the smallest overall failure ratio for the remaining logs. Some of these signatures contain a significant fraction of the logs in the system. For example a 1-signature corresponding to a device that handles a lot of traffic with a slightly higher failure ratio than the remaining of the network will have a significant impact.

A possible goal is to find a trade-off between inefficiency and significance on the network. The complementary signature proportion $\bar{\pi}$ indicates whether a 1-signature matters. The larger $\bar{\pi}(s)$, the less common signature s and the less that s contributes to failures. The trade-off is thus as follows: selecting signatures with the smallest values of $\bar{\lambda}$ but not if the corresponding $\bar{\pi}$ is too small. This goal is achieved by maximizing a linear combination of these two values:

$$v(s)=\bar{\pi}(s)-\alpha\bar{\lambda}(s)$$

The metric v may be called a problem indicator. It indicates to what extent an entity identity or signature s is involved in communication problems within the network.

The parameter $\alpha$ is weighs the two aspects mentioned above. Large values of $\alpha$ correspond to the "major contributors" (matching many logs), while small values focus on the "weak signal", i.e., the signatures/identities with fewer matching logs but whose failure rate is high. In some embodiments, to have a more robust solution, several values of $\alpha$ may be used. For example, ten values between 0 and 1 (e.g., 0.1, 0.2, 0.3, . . . , 1.0) and then twenty values between 1 and 20 (e.g., 1, 2, 3, . . . , 20). The first set of values ($\alpha$<1) corresponds to the weak signals while the second corresponds to the major contributors.

For each one of these values of $\alpha$, v is computed for each 1-signature and the twenty signatures with the largest values of v ("top twenty") are identified (alternatively, a number of top signatures other than twenty may be identified).

Then, how many times one of these signatures is in a top twenty is computed. A signature that often appears in the top twenty corresponds to a potential problem. The fifty signatures that appear more often in the top twenty are taken. In this fashion, a top involvement list is obtained. Notably, more or fewer than fifty signatures may be identified.

Nonetheless, some of these 1-signatures could correspond to the same underlying problem. That is what the following step addresses.

C. Equivalence Class Computation

The third step 206 consists of grouping signatures related to the same problem. As an example, consider a user connecting to a cell, where the user is the only active user, with an uncommon handset type. If, for some reason, the user experiences many consecutive bad sessions, the resulting logs are labelled as failed. In this case, the corresponding IMSI, handset type, and the cell ID appear at the top of the signature list that was generated in the previous step. The three signatures point to the same problem rather than three separate problems, and thus should be grouped into one 3-signature. In general, two signatures are equivalent when they match the same set of logs. However, it may not be possible to determine the causal relationship between the features and the failure. In the example above, the phone type and IMSI could be the cause of the failure or the cell could be the cause, or any combination of these three features could be the cause.

Two values for each pair of 1-signatures in the list produced by step 204 are computed:

$$c_1 = \frac{|E(s_1) \cap E(s_2)|}{|E(s_1)|}$$

$$c_2 = \frac{|E(s_1) \cap E(s_2)|}{|E(s_2)|}.$$

If both $c_1$ and $c_2$ are larger than a threshold $\gamma$, the two signatures are considered to be equivalent. In the remainder of the present disclosure, $\gamma$=0.9, but other values could be used. Each time an equivalent signature is found, the equivalence class is updated with the new signature. The outcome of this step is classes of signatures, where each class denotes one problem.

In other words, the equivalence class computation is the step of grouping all entity identities as mutually dependent into one group that essentially each appear in each data record of one set of data records and essentially do not appear in any other data records except those contained in said set.

D. Graph Computation

A hierarchical dependency is another case of multiple signatures corresponding to the same underlying problem. For example, a BSC connected to faulty cells would appear as inefficient even if it is not the cause of the problem. In order to highlight this type of dependency, a graph is created in step 208 to model the dependencies between equivalence classes determined in step 206. Each equivalence class can be seen as a k-signature. Equivalence classes are presented as the nodes of the graph. To connect the nodes, one-way dependencies are tested between equivalence classes (since mutual dependencies to identify equivalence have already been found). Therefore, for each k-signature $s_1$, all the signatures $s_2$ are found such that:

$$\frac{|E(s_1) \cap E(s_2)|}{|E(s_1)|} > \gamma$$

This equation identifies the logs covered by $s_1$ that are approximately a subset of the logs covered by $s_2$. This way, all the parent nodes of $s_1$ can be found. The output of this process is a directed acyclic graph, which is not necessarily connected.

Figure 3:
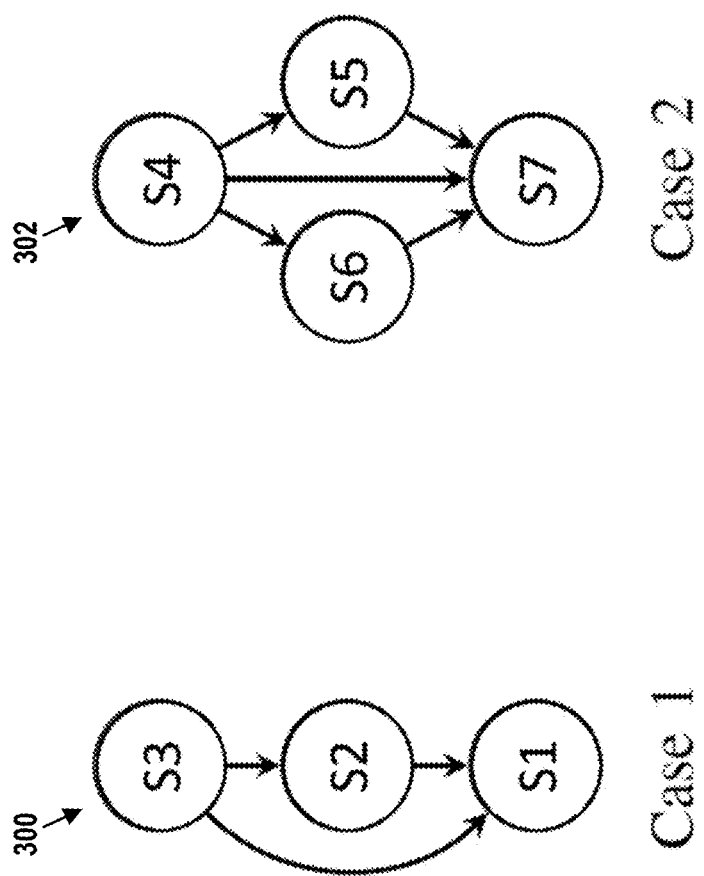
FIG. 3 depicts multiple dependency paths, in accordance with example embodiments.

The graph may also have superfluous connections, as shown in example 300 of FIG. 3. If $s_1$ depends on $s_2$ ($s_2$ is the parent node of $s_1$) and $s_2$ depends on $s_3$, then $s_1$ depends on $s_3$. If the graph is generated as explained above, there are two paths between $s_1$ and $s_3$: a direct connection and an indirect connection via $s_2$. In this case, the direct connection between $s_1$ and $s_3$ is irrelevant since it does not add any information compared to the connection via $s_2$.

To address such cases, a depth-first search algorithm may be used to find all the paths between every pair of connected nodes. From these, only the longest path is kept. Doing so does not lead to any information loss. Consider example 302 in FIG. 3. There are three paths from $s_4$ to $s_7$. Without loss of generality, assume that the path through $s_6$ is the longest one. Then, only this path is kept. However, since $s_7$ depends on $s_5$ (and there is only one path between $s_4$ and $s_5$), this link is kept as longest one between $s_4$ and $s_5$. The same procedure can be applied to the link between $s_5$ and $s_7$. In this case, only the direct link between $s_4$ and $s_7$ is removed.

Summarizing, step 208 corresponds to linking two groups obtained by the above equivalence class computation as hierarchically dependent, with one group being the parent group and the other group being the child group, if the latter essentially covers a set of data records that is a subset of the data records covered by the former.

E. Graph Pruning

The structure of the graph allows the exploration of faulty devices and services in a hierarchical way. At the top, there are frequent signatures (having a high $\pi$) such as core network equipment, popular services and handset manufacturers. At the bottom of the graph, there are less frequent signatures such as user IMSI, host IP addresses, and the least used cell IDs.

In a well-constructed graph, each child node has extra information when compared to its parent nodes. Otherwise, it would be irrelevant (and then removed). Particularly, each parent node is inefficient to some extent (all the nodes of the graph are made up of the inefficient signatures selected in step 204). In addition, as the child node covers a subset of logs of parent, it is expected to be inefficient as well. Therefore, presenting the child node is only meaningful in the case where it is more inefficient than at least one of its parent nodes. To remove superfluous nodes in step 210, a measure called Relative Failure Ratio $\lambda_r$ is defined as follows.

Suppose there are two connected nodes:

$$\lambda_r(s_c, s_p) = \frac{\lambda(s_c) - \lambda(s_p)}{\lambda(s_p)}$$

where $s_p$ is the signature in the parent node and $s_c$ the signature in the child node.

For each node, its relative failure ratio is calculated with regard to all its parents. The node is kept if at least one of the relative failure ratios is greater than 0.01. Otherwise, it is removed. Every time a node is removed, its ancestors are connected to its successors. After this pruning operation, every child node in the graph is more inefficient than at least one of its parent nodes. In such case, there are two possible scenarios.

In the first scenario, the child node presents a separate problem. This could be the case of a user continuously trying to call an unreachable number through a cell having an interference problem. In the graph, the node containing the user IMSI can be found as a child of cell ID node with a user IMSI failure ratio higher than the cell failure ratio. The user calling an unreachable number and the radio interference problem are two separate issues. Hence, it is wise to keep the two nodes.

In the second scenario, the child node is the root of the inefficiency of the parent node. Consider the case of a large group of roaming users (tourists, for example) accessing the network through a small cell (with few resident users). The roaming users may experience a bad QoE because of a roaming issue between their home network and the host network. Since the roaming users are the main users of the cell, the cell has a high failure ratio $\lambda$. In the graph, the MNC of the roaming users is found as a child node of the cell with a slightly higher $\lambda$. In this case, the node containing the cell ID is removed since roaming is the real issue.

The second scenario is addressed as follows. Consider two connected nodes: a parent node $s_p$ and a child node $s_c$. Let $\lambda_n$ be the overall failure ratio of the network.

$$\lambda_n = \frac{|F|}{|E|}$$

One possible goal is to determine whether the high failure ratio of $s_p$ is due to $s_c$. To do so, the logs matching $s_p$, $E(s_p)$ are considered instead of using the whole data set. In this subset, the complementary failure ratio $\overline{\lambda}(s_c)$ is calculated, which is the failure ratio of $s_p$ after removing the logs containing $s_c$. If $\overline{\lambda}(s_c) \leq \lambda_n$, then $s_p$ is a non-faulty signature and the parent node is removed. Otherwise, the first scenario applies and the two nodes present two different problems. As previously mentioned, each time a node is removed, its ancestors are connected to its successors. With these new connections, there may be other nodes to remove. So the pruning process should be repeated until convergence.

Summarizing, graph pruning involves discarding each child group which does not contain extra information compared to all of its parent groups, and/or discarding each parent group whose involvement in communications problems is essentially due to its one or more child groups.

IV. EXAMPLE INCOMPATIBILITY DETECTION

The major contributor detection of FIG. 2 allows us to detect critical issues with a high impact on the network. Incompatibility detection is a complementary analysis to detect more subtle but less urgent issues. This analysis may be triggered on demand in order to improve the network performance by detecting incompatibilities.

An incompatibility is a dysfunctional combination of functional elements. For example, in the case of TCP connections, a new version of an OS might not supporting Secure Sockets Layer (SSL) encryption. The software upgrade may contain an implementation bug in the encryption process. In the case of voice calls, an example is the case of calls starting in 4G and then switching to 2G. An incorrect configuration of the Circuit Switched Fallback (CSFB) procedure or the use of equipment from different vendors may cause most of these multi-RAT calls to drop. However, mono-RAT calls, (IP Multimedia Subsystem (IMS) and pure 2G), may have very low drop rate.

Figure 4:
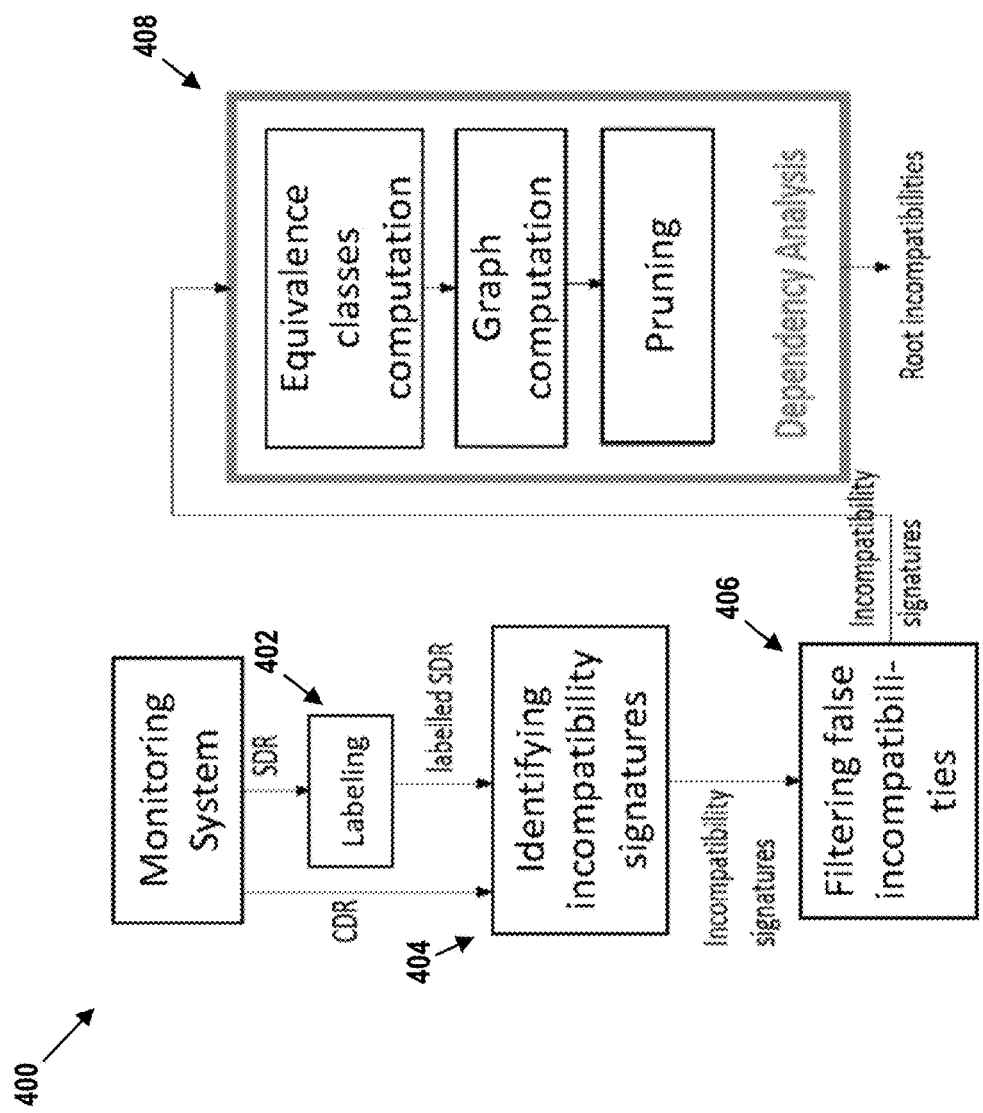
FIG. 4 is a flow chart depicting incompatibility detection, in accordance with example embodiments.

FIG. 4 shows a graphical representation 400 of example main steps of incompatibility detection. At step 402, data is labelled as explained above in the context of step 202. At step 404, signatures pointing to incompatibilities throughout the network are identified. At step 406, false incompatibilities are filtered. False incompatibilities may include an inefficient combination of efficient elements. However, this inefficiency might not result from combining the two elements but rather from a third inefficient element co-occurring with the combination most of the time. At step 408, a dependency analysis is performed, similar to that previously described, where the different incompatibilities are navigated to find the root incompatibilities.

A. Identifying Incompatibility Signatures

A possible goal of step 404 is to list the signatures of incompatibilities. To do so, the sets of all 1-signatures and 2-signatures are generated. For each signature, the failure ratio $\lambda$ is measured. To decide whether a 2-signature points to an incompatibility, the following procedure is carried out.

Consider a 2-signature s={si, sj}, where si and sj are values taken by the features f1 and f2. Let s1={si} and s2={sj}, where si is the value of f1 and sj is the value of f2 be two 1-signatures composing s. For example:

$$s=((service;a587);(handset\ os;c255))$$

$$s1=(service;a587); s2=(handset\ os;c255)$$

The gain of s is defined as:

$$g(s)=\lambda(s)-\max(\lambda(s1),\lambda(s2))$$

The gain g may also be called a problem indicator. It indicates to what extent an entity identity pair or signature pair or 2-signature is involved in communications problems within the network. The gain allows evaluation of the impact of combining two 1-signatures on the failure ratio. In other words, whether the combination of two elements is more inefficient than each one apart. To identify incompatibilities, a threshold for the gain is set. If, for the 2-signature s, g(s) is greater than 0.2, s denotes a potential incompatibility. The value of 0.2 is just one possibility. Other values, such as 0.1, 0.15, 0.25, or 0.3 may be used.

B. Filtering False Incompatibilities

A combination with a higher failure ratio than each of its components does not automatically imply that there is an incompatibility. Take the example of a service and a handset type, both having a low failure ratio. However, the combination of these two elements has a high failure ratio. This combination could be identified in the previous step as an incompatibility. However, by studying the logs matching this combination, there may be a single IMSI of a user making repetitive attempts to access the service without respecting the service access instructions.

In order to filter cases such as these, step 406 proceeds as follows. For each 2-signature s selected in the previous step, its matching set of logs E(s) is identified. In this subset, all the highly present 1-signatures t are identified as:

$$\tau(s) = \left\{ t \mid \frac{|E(t) \cap E(s)|}{|E(s)|} > \gamma \right\}$$

Where $\gamma$=0.9 or a similar value. Then the gain is recomputed as:

$$g(s) = \lambda(s) - \max_{t \in \tau}(\lambda(t))$$

If the gain remains higher than the threshold, it means that the combination is a real incompatibility. There is no third element with a high failure ratio co-occurring with the combinations. Otherwise, if the gain drops, the combination is not the origin of the high failure ratio which rather lies with a third element.

C. Dependency Analysis

At this point of the algorithm, there is a list of 2-signatures denoting incompatibilities. This top involvement list is automatically analysed to identify the root issues. In this fashion, experts can be provided with accurate information to decide on the recovery process. To do so, at step 408 a dependency analysis is carried out.

First, equivalent incompatibilities are grouped. Consider an incompatibility detected between a handset type and an e-NodeB. If this e-NodeB is configured to have one static IP address, two incompatibilities pointing to the same issue could have been detected: the handset type with the e-NodeB identifier and the handset type with the e-NodeB IP address. In this case, the e-NodeB identifier and its IP address should be grouped as one equivalent class. To deal with redundancies, all 1-signatures (elements) identified as incompatible with one or multiple elements are listed. Then, for each 1-signature s, the set of 1-signatures that are incompatible with it, I(s)={s1, s2, . . . sp}, are found. Set I(s) is grouped into equivalence classes. Thus, for each signature there is a list of equivalence classes (k-signatures with k variable) that are incompatible with it.

D. Graph Computation

Some incompatibilities may result from other incompatibilities. For example, there may be an incompatibility between an OS and a service. All the OS versions will be incompatible with that same service. Thus, to identify the root incompatibility, the hierarchical dependencies should be explored. Therefore, for each signature s, a dependency graph is created as discussed above.

E. Pruning

At this point of the analysis, for each identified signature s, there is a dependency graph of the elements incompatible with s. For each pair of connected parent and child nodes ($s_p$, $s_c$) of the graph, two scenarios are possible: (1) the parent is the origin of the incompatibility with s, or (2) the child is the origin of the incompatibility with s.

To find the root incompatibility, the failure ratio $\lambda(s)$ is substituted with the gain g(s). In other words, it is verified that, if after removing the logs containing $s_c$, $s_p$ remains incompatible with s. In this case, the logs matching $s_c$ are removed, and the gain is recomputed. If the gain is still higher than the threshold, then the parent is at the origin of the issue and the root incompatibility is between s and $s_p$. If, on the contrary, the gain drops below the threshold, then $s_c$ is the origin of the incompatibility with s. This process is repeated until convergence. The output of this analysis is a list of the root incompatible signatures, which lead to other incompatibilities appearing at different levels of the network.

V. EXPERIMENTAL RESULTS

ARCD was applied to three data sets coming from three different wireless network operators.

Set 1 is a sample of 25,000 SDRs recording TCP connections during one hour in a European country. This set was evaluated by a human expert, who cleaned the data so that it could be used as a reference in the validation process.

Set 2 includes 10 million SDRs recording TCP connections during one day from another European operator. This set is a raw, in that some data records are missing values or have inconsistent values. This set was not evaluated by an expert.

Set 3 includes 1 million CDRs logging voice calls during one day from an Asian operator. This is also a raw set and has no pre-specified root causes.

A. Major Contributor Detection
1. Validation

To validate the results for set 1, the expert feedback was used. To validate the results on sets 2 and 3, an expert emulator was created, which mimics the manual analysis done by human experts. The emulator analyses a limited number of features (less than ten). For sets 2 and 3, the experts supervising the networks of the corresponding operators kindly indicated the features they are focusing on. For each feature, the emulator scans on the top ten frequent elements (e.g., top popular services). If one element is more inefficient than the global network, the element is identified as a major contributor.

To pinpoint inefficient elements, the expert emulator calculates the following metrics per element and compares them to the overall value of the whole network: failure ratio for CDRs (set 3), retransmission ratio, server response time, and mobile response time for SDRs (set 2). These metrics are the same used in the labelling phase of ARCD.

The concept of hierarchical dependencies is implicitly included in the expert analysis. Experts start by high-level elements (e.g., core equipment) down to low levels ones (e.g., users).

2. Parameter Tuning

Figure 5:
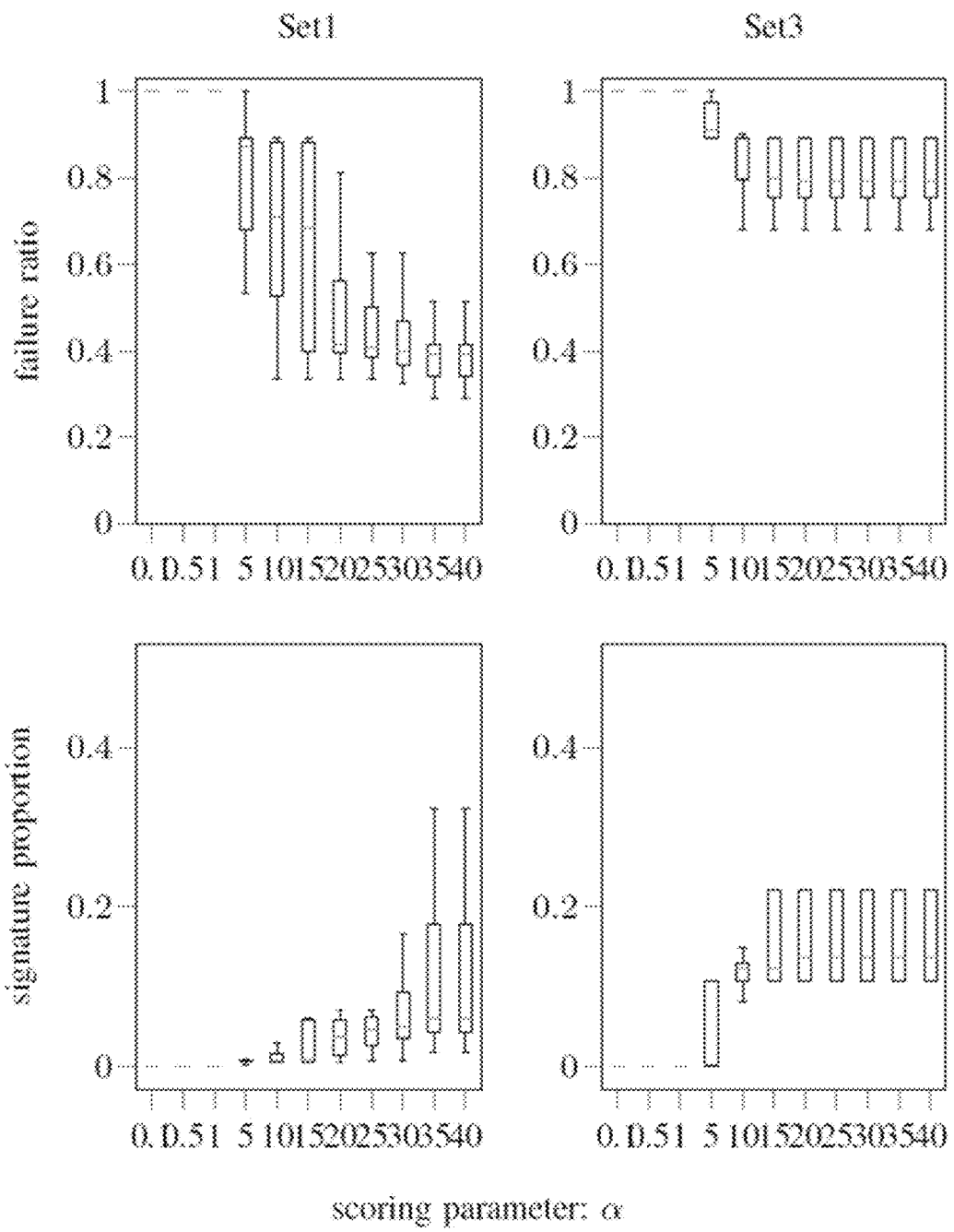
FIG. 5 depicts box-plots of failure ratio and signature proportion as functions of a scoring parameter, in accordance with example embodiments.

A range of values for $\alpha$ was used to find the top signatures. FIG. 5 shows the distribution of the signature proportion and the failure ratio of the top twenty ranked signatures for each value of the scoring parameter $\alpha$ for Set 1 and Set 3. As previously explained, the higher $\alpha$, the higher the signature proportion (corresponding to the most used devices and services). FIG. 5 also shows that the smaller $\alpha$ is, the higher the failure ratio. This is not surprising as small values of $\alpha$ correspond to the most inefficient elements. As one can notice, for both SDR and CDR, the distributions have the same trend.

By scanning an interval containing a large range of values for $\alpha$, ARCD identifies the most significant problems, which are feature values with a sufficiently high number of occurrences to deserve attention and a sufficiently high number of failures to suspect a malfunction.

3. Benchmarking

The following metrics were used to evaluate the ARCD embodiments described herein.

True Positives (TP) are inefficient elements detected by ARCD and validated either by the expert or by the emulator. False Negatives (FN) are inefficient elements detected by either the expert or the emulator but not detected by ARCD. False Positives (FP) are efficient elements detected by ARCD but not detected in the validation process because their inefficiency is no greater than the overall inefficiency of the network. Extra features (EF) are inefficient elements detected by ARCD but not detected in the validation process because of the limited number of features analysed by experts due to time constraints. Extra values (EV) are inefficient elements detected by ARCD but not detected in the validation process because experts only analyse the top 10 frequent elements of each considered feature.

TABLE 2

Major contributor results.

| | TP | FN | FP | EF | EV | Precision | Recall |
|---|---|---|---|---|---|---|---|
| Set 1 | 11 | 2 | 0 | 38 | 1 | 1 | 0.96 |
| Set 2 | 5 | 2 | 5 | 30 | 10 | 0.9 | 0.95 |
| Set 3 | 4 | 1 | 0 | 30 | 16 | 1 | 0.9 |

Table 2 shows the overall performance of ARCD, which is satisfying in terms of TP, FP and FN. The interesting aspect of ARCD is its capability to detect issues that are not identified by experts since experts only focus on highly frequent elements (such as handset types, services, core equipment, and RAN) due to time constraints. For this reason, experts miss issues occurring at a finer level of granularity—which ARCD does detect—such as roaming issues, bad cell coverage, TAC not supporting specific services, or individual users (bots) submitting a large number of call requests to unreachable numbers.

The precision value is the percentage of observations, out of all observations predicted to be in a particular category, that are actually in the particular category. Precision may be calculated as the number of true positives divided by the number of true positives plus the number of false positives. The recall value measures the ability to identify all observations of interest in a data set, and may be calculated as the number of true positives divided by the sum of the number of true positives and the number of false negatives. As both precision and recall are close to their maximum values of 1, this indicates that the experimental results are highly accurate.

4. Use Case

Figure 6A:
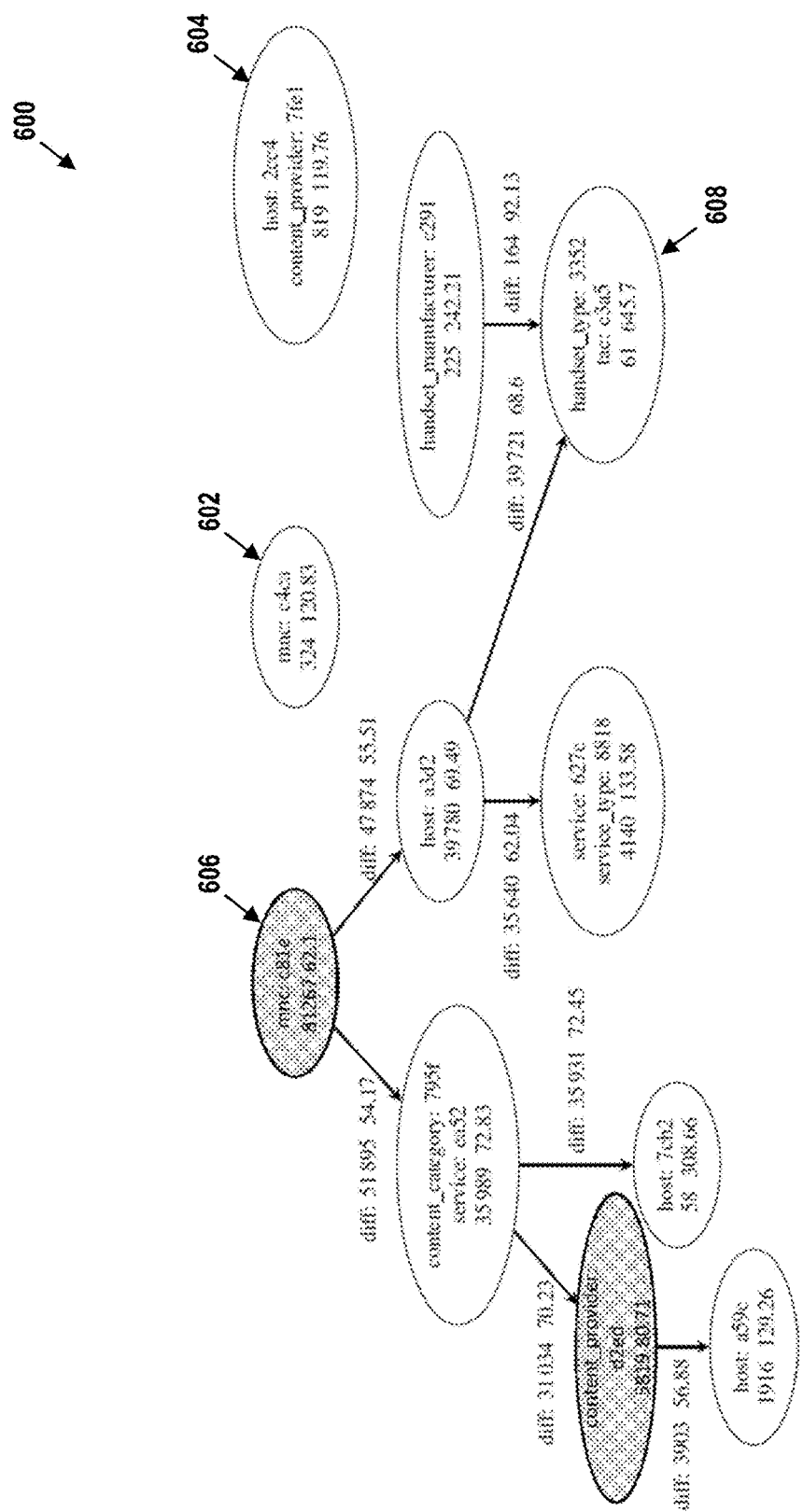
FIG. 6A depicts a pruned graph obtained with ARCD, in accordance with example embodiments.

FIG. 6A is an example of the output 600 of ARCD. This graph was created based on data from Set 2. The criterion for SDR labelling is the server response time (SDR is considered to have failed if the response time is larger than 100 milliseconds). The nodes of the graph contain signatures detected as major contributors. Each node contains the features, a hash of their values (for confidentiality reasons) and two numbers: the number of logs containing the signature and the average response time of the data set covered by the signature. The response time is displayed rather than the failure ratio to ease interpretation of the graph. The labels on the edges contain the log size and the average response time of the set containing the parent signature and not containing the child signature. The patterned nodes are removed during the pruning process because they denote false problems. The overall server response time of the network is equal to 60 milliseconds.

The graph points to two individual problems: a roaming issue (mnc: c4ca) denoted by arrow 602, and a content provider issue (host: 2cc4, content_provider: 7fe1) denoted by arrow 604.

There is also a set of co-dependent problems with an MNC (mnc: c81e), denoted by arrow 606. This MNC has a large number of logs and a response time slightly higher than the overall network. By detecting this MNC, one may think of a roaming issue. However, by if one of its child nodes were to be removed, its average response time drops below the average value of the network. That is why this issue was tagged as a false problem and was removed in the pruning step. The same reasoning applies to the node for (Content Provider: d2ed).

The node (handset_type: 3352, tac:c3a5) has two parent nodes: (handset_manufacturer: c291) and (host: a3d2). This node is highly more inefficient than its two parents. That is why it is kept in the graph.

Notably, the nodes in the dependency graph contain signatures of inefficient elements. The pruning process facilitates finding among these nodes the root causes of network issues. FIG. 6A depicts two nodes being discarded: (mnc: c81e) and (content_provider: d2ed). The (mnc: c81e) node is discarded because after removing the data records matching one of its child nodes, for example (content_category: 795f), its response time drops to 54 milliseconds.

This is below the overall network response time of 60 milliseconds. The same reasoning applies to (content_provider: d2ed) and its child node (host: a59c).

B. Incompatibility Detection

1. Validation Process

Validating incompatibilities is more complex than validating major contributors. Incompatibilities are fine-grained issues and experts do not work on this type of issue on a regular basis. In fact, while investigating incompatibilities requires a lot of time and effort, the number of impacted subscribers is generally low. To validate the results, experts were consulted. After testing the solution described herein on the three data sets, the results were reviewed by experts. Based on their expertise, they analyzed the logs matching each reported incompatibility to evaluate the accuracy of the results.

2. Benchmarking

The benchmarking procedures relied on true positive (TP) and false positive (FP) detection. These metrics were described above.

TABLE 3

Incompatibility results.

|  | TP | FP | Precision |
|---|---|---|---|
| Set 1 | 10 | 1 | 0.91 |
| Set 2 | 15 | 2 | 0.88 |
| Set 3 | 6 | 1 | 0.86 |

The overall performance of the solution was found to be satisfying. The reported issues were confirmed by experts to be worth diagnosing and fixing. In the case of SDRs, mainly incompatibilities between services/content categories with handset types/OS versions were detected. Regarding CDRs, issues in multi-RAT calls, inaccessible destinations in a specific RAT, and issues in location update procedure in some cells were mostly responsible for the discovered incompatibilities.

3. Use Case

TABLE 4

Incompatibility results.

|  | Class 1 | Class 2 | Count | λ | λ1 | λ2 |
|---|---|---|---|---|---|---|
| 0 | [(content provider, 8cfe)] | [(handset manufacturer, 70d1)] | 729 | 0.82 | 0.21 | 0.31 |
| 1 | [(host, 7a35), (content provider, 90fc)] | [(mcc mnc, d645)] | 685 | 0.81 | 0.02 | 0.43 |
| 2 | [(content provider, 120c)] | [(os name, edc9), (os version, 4c8b)] | 857 | 0.60 | 0.30 | 0.12 |
| 3 | [(handset manufacturer, 1fe4)] | [(service type, 293c), (service, 293c)] | 1071 | 0.77 | 0.34 | 0.18 |

Table 4 above is an example of the output of the solution. It contains a sample of the results of analyzing Set 2 based on server response time. Class 1 and Class 2 are the signatures of the incompatible equivalence classes. Count is the number of logs matching the two signatures combined. The values of $\lambda_1$, $\lambda_2$, and $\lambda$ are respectively the failure ratios of Class 1, Class 2 and, the combination of Class 1 and Class 2. Table 4 identifies several different types of issues.

First, rows 0 and 3 show an incompatibility between a handset manufacturer and a service/content provider. This is the case of some handset manufacturers designing their phones in a way that does not fully support a service or a type of content. Such an issue can be seen when operators implement new services.

Second, row 1 shows an inaccessible host by roamers from a specific network. Roaming is a complex procedure as it involves multiple mobile operators. For this reason, it is likely to have some improper configurations.

Third, row 2 shows an incompatibility between an OS version and a content provider. This is the case of an OS upgrade having implementation errors when processing a specific type of content.

Figure 6B:
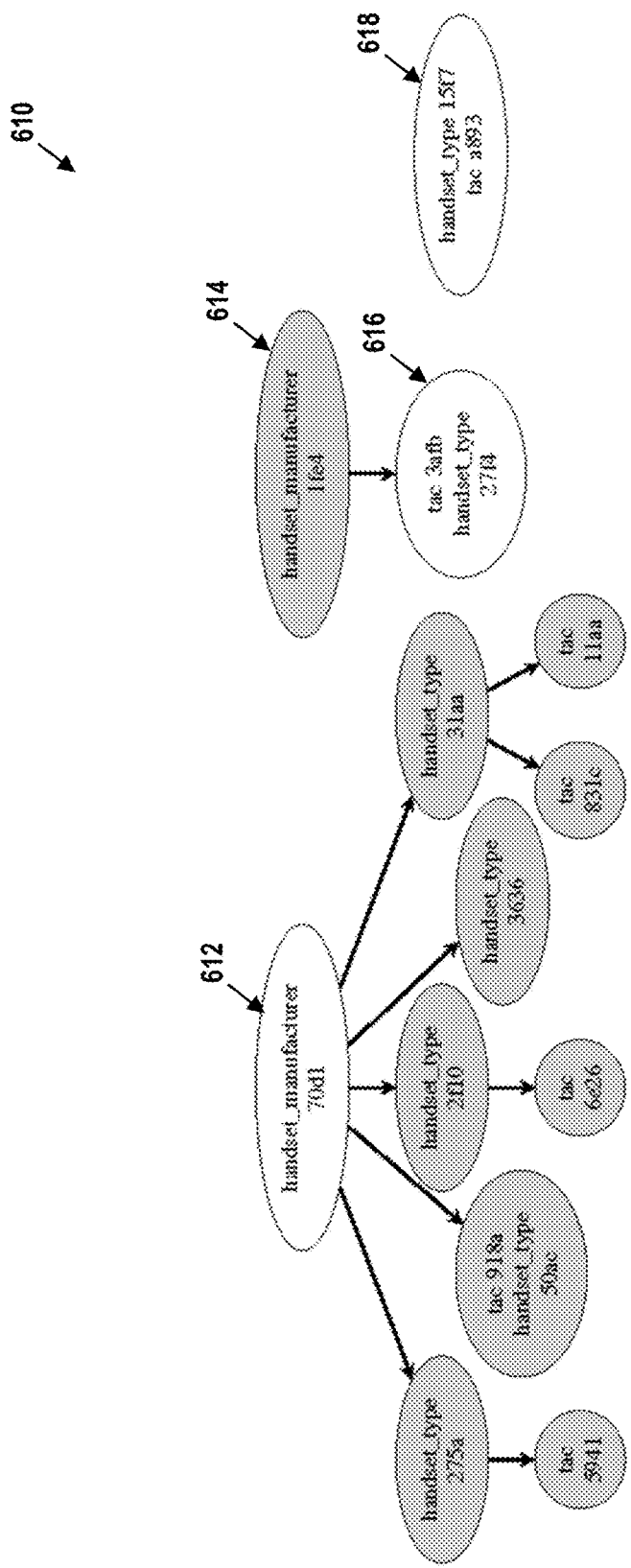
FIG. 6B depicts a pruned graph obtained using incompatibility detection, in accordance with example embodiments.

FIG. 6B depicts an example pruned dependency graph 610 using the incompatibility detection embodiments herein. For each 1-signature ρ, a graph of the elements incompatible with ρ is generated. FIG. 6B is the graph of the elements incompatible with the 1-signature (content_category: 795f). The gray nodes are removed during the pruning step. The issues highlighted in FIG. 6B are incompatibilities between a content category and a handset. The graph shows the three families of handsets (three connected components of the graph) that are incompatible with (content_category: 795f).

The first connected component starting with (handset_manufacturer: 70d1) 612 is incompatible with (content_category: 795f). Many handset types and Type Allocation Codes (TACs) of this same handset manufacturer are incompatible with (content_category: 795f) as well. These handset types and TACs are removed during the pruning process and are colored in gray. The root of the incompatibility with (content_category: 795f) is (handset_manufacturer: 70d1) 612. The incompatibilities between the handset types and the TACs with (content_category: 795f) result from this root incompatibility.

The two connected nodes (handset_manufacturer: 1fe4) 614 and (tac: 3afb, handset type: 27f4) 616 are also incompatible with (content_category: 795f). In this case (tac: 3afb, handset type: 27f4) 616 is the origin of the incompatibility with (content_category: 795f). The incompatibility between (handset_manufacturer: 1fe4) 614 and (content_category: 795f) results from it.

The isolated node (handset type: 15f7, tac: a893) 618 is also incompatible with (content_category: 795f): This handset type is simply incompatible with (content_category: 795f).

VI. THE BENEFITS OF ARCD

The present disclosure addresses the problem of automating the system that diagnoses cellular networks based on the data collected from large-scale monitoring system. ARCD is an unsupervised framework for root cause diagnosis in cellular networks. In addition to automating expert analysis, it carries the analysis at a deeper level. In comparison with the prior art, ARCD can run on a large number of features with non-numerical values, to identify the complex interplay between various features, and to provide a review of the main identified malfunctioning devices and services. ARCD can also be linked to an anomaly detection system within the same monitoring platform. This way the anomaly detector triggers the root cause diagnosis process, ideally in real time, to provide a self-healing cellular network.

The benefits of using ARCD over previous techniques can be summarized as follows. ARCD detects issues at any level of the network ranging from core equipment to cells and users. It also covers different kinds of features: services, devices and users. ARCD can get any type of xDR (labelled or unlabelled) as an input since it includes a tagging step. Grouping issues into equivalence classes makes the work of the expert much easier with regards to the understanding of issue distribution. Discovering the hierarchical dependencies based on statistics is valuable since there is no more need for manual intercessions every time the topology of the network is modified. Discovering the occasional dependencies is helpful since they are unpredictable by experts. Automatically discarding false problems (the pruning step) is quite useful to narrow issues during investigation. The output of ARCD is a graph concentrating issues in different levels with sufficient information to trigger compensation and recovery operations.

VII. EXAMPLE COMPUTING DEVICES

Figure 7:
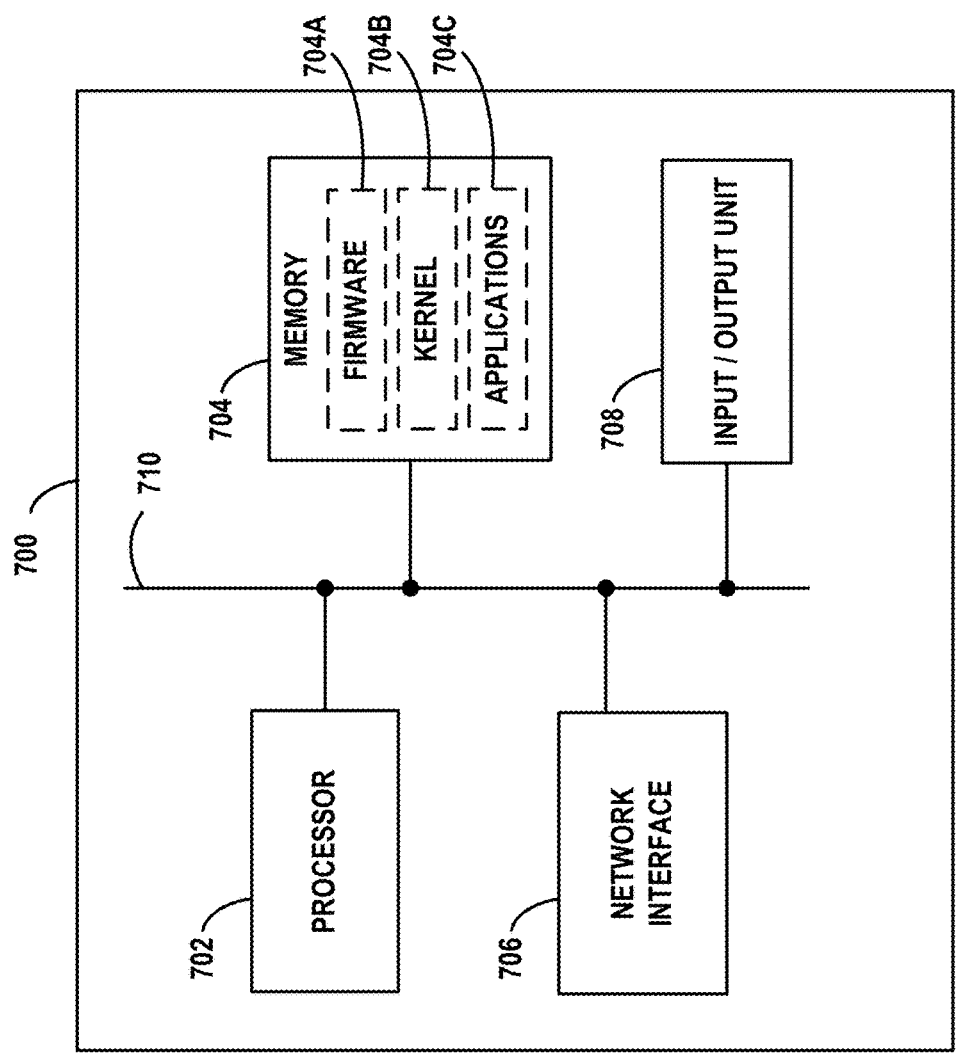
FIG. 7 depicts a block diagram of a computing device, in accordance with example embodiments.

The embodiments herein may operate on various types of computing devices. FIG. 7 is a simplified block diagram exemplifying such a computing device 700, and illustrating some of the components that could be included in a computing device arranged to operate in accordance with the embodiments herein.

Computing device 700 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 700 includes processor 702, memory 704, network interface 706, and an input/output unit 708, all of which may be coupled by a system bus 710 or a similar mechanism. In some embodiments, computing device 700 may include other components and/or peripheral devices (e.g., detachable storage, printers, and so on).

Processor 702 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 702 may be one or more single-core processors. In other cases, processor 702 may be one or more multi-core processors with multiple independent processing units. Processor 702 may also include register memory for temporarily storing instructions being executed and related data, as well as cache memory for temporarily storing recently-used instructions and data.

Memory 704 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 704 represents both main memory units, as well as long-term storage. Other types of memory may include biological memory.

Memory 704 may store program instructions and/or data on which program instructions may operate. By way of example, memory 704 may store these program instructions on a non-transitory, computer-readable medium, such that the instructions are executable by processor 702 to carry out any of the methods, processes, or operations disclosed in this specification or the accompanying drawings.

As shown in FIG. 7, memory 704 may include firmware 704A, kernel 704B, and/or applications 704C. Firmware 704A may be program code used to boot or otherwise initiate some or all of computing device 700. Kernel 704B may be an operating system, including modules for memory management, scheduling and management of processes, input/output, and communication. Kernel 704B may also include device drivers that allow the operating system to communicate with the hardware modules (e.g., memory units, networking interfaces, ports, and busses), of computing device 700. Applications 704C may be one or more user-space software programs, such as web browsers or email clients, as well as any software libraries used by these programs. Memory 704 may also store data used by these and other programs and applications.

Network interface 706 may take the form of one or more wireline interfaces, such as Ethernet (e.g., Fast Ethernet, Gigabit Ethernet, and so on). Network interface 706 may also support communication over one or more non-Ethernet media, such as coaxial cables or power lines, or over wide-area media, such as Synchronous Optical Networking (SONET) or digital subscriber line (DSL) technologies. Network interface 706 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 706. Furthermore, network interface 706 may comprise multiple physical interfaces. For instance, some embodiments of computing device 700 may include Ethernet, BLUETOOTH®, and Wifi interfaces.

Input/output unit 708 may facilitate user and peripheral device interaction with computing device 700. Input/output unit 708 may include one or more types of input devices, such as a keyboard, a mouse, a touch screen, and so on. Similarly, input/output unit 708 may include one or more types of output devices, such as a screen, monitor, printer, and/or one or more light emitting diodes (LEDs). Additionally or alternatively, computing device 700 may communicate with other devices using a universal serial bus (USB) or high-definition multimedia interface (HDMI) port interface, for example.

In some embodiments, one or more computing devices like computing device 700 may be deployed in a remote architecture. The exact physical location, connectivity, and configuration of these computing devices may be unknown and/or unimportant to client devices. Accordingly, the computing devices may be referred to as "cloud-based" devices that may be housed at various remote data center locations.

VIII. EXAMPLE OPERATIONS

Figure 8A:
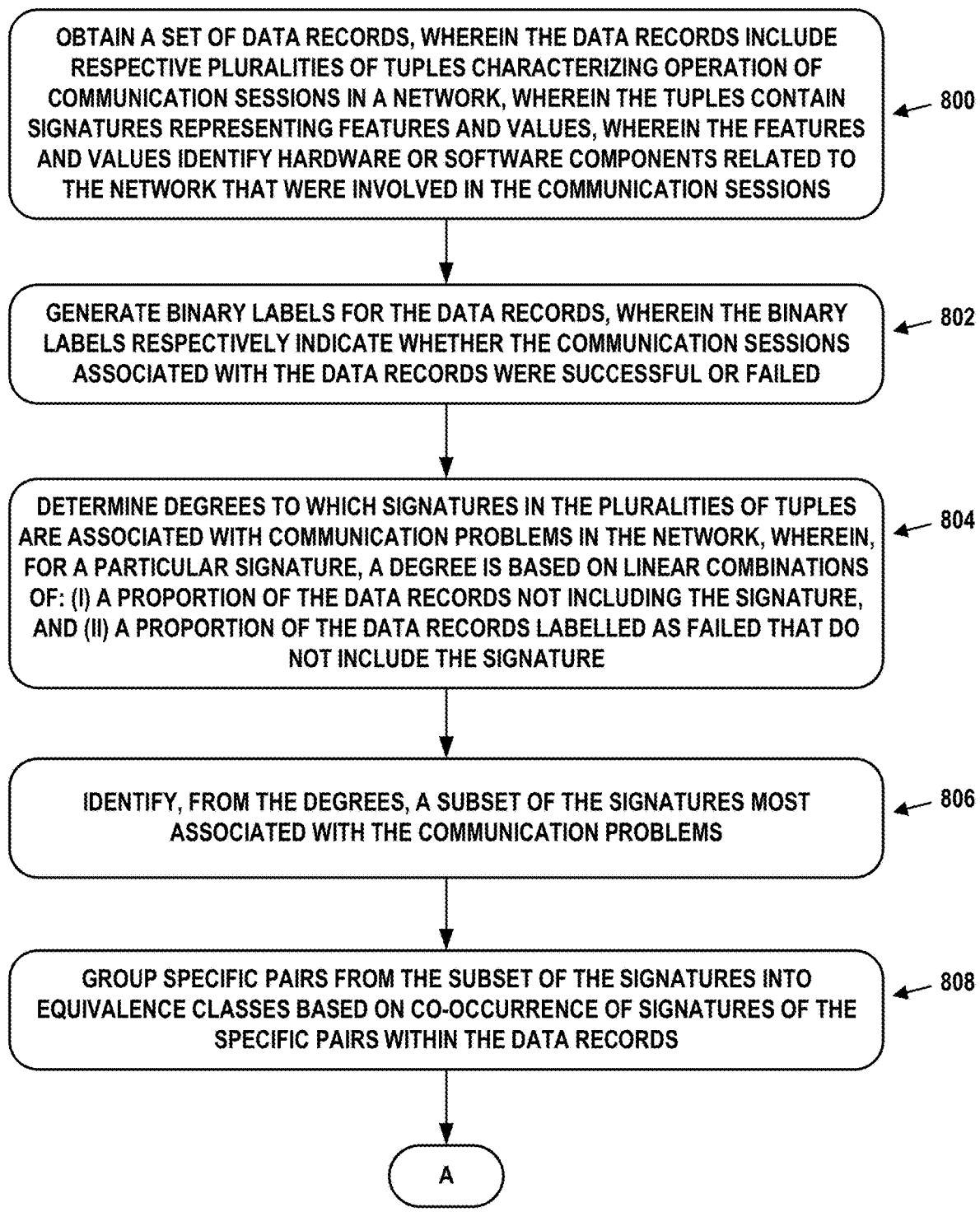
FIGS. 8A and 8B depict a flow chart, in accordance with example embodiments.
Figure 8B:
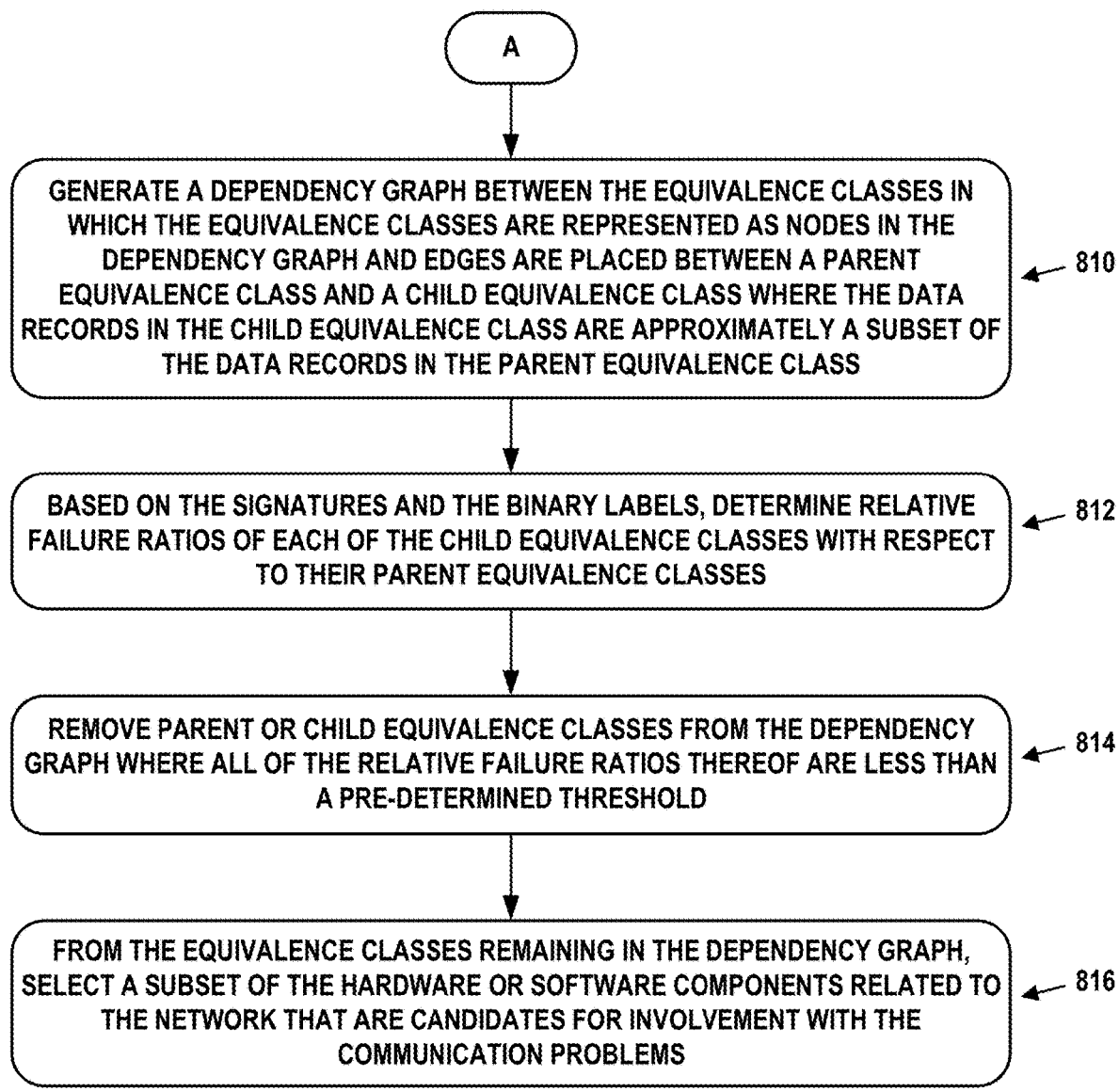

FIGS. 8A and 8B depict a flow chart illustrating an example embodiment. The process illustrated by FIGS. 8A and 8B may be carried out by a computing device, such as computing device 700. However, the process can be carried out by other types of devices or device subsystems. For example, the process could be carried out by a portable computer, such as a laptop or a tablet device, or a cluster of computing devices.

The embodiments of FIGS. 8A and 8B may be simplified by the removal of any one or more of the features shown therein. Further, these embodiments may be combined with features, aspects, and/or implementations of any of the previous figures or otherwise described herein.

Block 800 may involve obtaining a set of data records, wherein the data records include respective pluralities of tuples characterizing operation of communication sessions in a network, wherein the tuples contain signatures representing features and values, wherein the features and values identify hardware or software components related to the network that were involved in the communication sessions.

Block 802 may involve generating binary labels for the data records, wherein the binary labels respectively indicate whether the communication sessions associated with the data records were successful or failed.

Block 804 may involve determining degrees to which signatures in the pluralities of tuples are associated with communication problems in the network, wherein, for a particular signature, a degree is based on linear combinations of: (i) a proportion of the data records not including the signature, and (ii) a proportion of the data records labelled as failed that do not include the signature.

Block 806 may involve identifying, from the degrees, a subset of the signatures most associated with the communication problems.

Block 808 may involve grouping specific pairs from the subset of the signatures into equivalence classes based on co-occurrence of signatures of the specific pairs within the data records.

Block 810 may involve generating a dependency graph between the equivalence classes in which the equivalence classes are represented as nodes in the dependency graph and edges are placed between a parent equivalence class and a child equivalence class where the data records in the child equivalence class are approximately a subset of the data records in the parent equivalence class (e.g., where the data records match the signature of the child equivalence class). For example, determining such an approximate subset may involve, for each k-signature $s_1$, finding all the signatures $s_2$ such that:

$$\frac{|E(s_1) \cap E(s_2)|}{|E(s_1)|} > \gamma$$

Where $\gamma$ is a threshold defined as above. This equation identifies the logs covered by $s_1$ that are approximately a subset of the logs covered by $s_2$.

Block 812 may involve, based on the signatures and the binary labels, determining relative failure ratios of each of the child equivalence classes with respect to their parent equivalence classes.

Block 814 may involve removing parent or child equivalence classes from the dependency graph where all of the relative failure ratios thereof are less than a pre-determined threshold.

Block 816 may involve, from the equivalence classes remaining in the dependency graph, selecting a subset of the hardware or software components related to the network that are candidates for involvement with the communication problems.

In some embodiments, generating a binary label for a data record involving a voice or multimedia call facilitated by the network comprises determining, from packet traffic collected from the network, whether to label the data record as successful or failed based on call management messages related to the voice or multimedia call.

In some embodiments, generating a binary label for a data record involving a data session facilitated by the network comprises determining, from packet traffic collected from the network, whether to label the data record as successful or failed based on response times of devices and a packet retransmission ratio of the data session.

In some embodiments, a pair from the specific pairs includes a first signature and a second signature, and grouping the pair into an equivalence class of the equivalence classes comprises: (i) extracting a first subset from the data records containing the first signature and a second subset from the data records containing the second signature; (ii) calculating a first cardinality of the first subset and a second cardinality of the second subset; (iii) determining a union of the first subset and the second subset; (iv) calculating a third cardinality of the union; (v) determining that a first quotient of the third cardinality divided by the first cardinality exceeds a pre-determined threshold, and a second quotient of the third cardinality divided by the second cardinality exceeds the pre-determined threshold; and (vi) based on the first quotient and the second quotient both exceeding the pre-determined threshold, placing the first signature and the second signature in the equivalence class. The pre-determined threshold may be between 0.8 and 0.95, between 0.6 and 1.0, or may take on other values.

In some embodiments, a first equivalence class contains a first signature and a second equivalence class contains a second signature, and generating the dependency graph comprises: (i) extracting a first subset from the data records containing the first signature and a second subset from the data records containing the second signature; (ii) calculating a first cardinality of the first subset; (iii) determining a union of the first subset and the second subset; (iv) calculating a second cardinality of the union; (v) determining that a quotient of the second cardinality divided by the first cardinality exceeds a pre-determined threshold; and (vi) based on the quotient exceeding the pre-determined threshold, identifying the first equivalence class as the child equivalence class and the second equivalence class as the parent equivalence class. Again, the pre-determined threshold may be between 0.8 and 0.95, between 0.6 and 1.0, or may take on other values.

In some embodiments, the dependency graph is a directed acyclic graph.

Some embodiments may further involve: (i) performing a depth-first search on the dependency graph to find all paths between each pair of connected nodes therein, wherein each of the paths is represented as one or more adjacent edges in the dependency graph; and (ii) removing all edges except for those on a longest of the paths between each pair of connected nodes.

In some embodiments, removing a child equivalence class from the dependency graph comprises connecting, in the dependency graph, parent equivalence classes of the child equivalence class to further child equivalence classes of the child equivalence class. Alternatively, removing a parent equivalence class from the dependency graph comprises connecting, in the dependency graph, further parent equivalence classes of the parent equivalence class to the child equivalence classes.

In some embodiments, further operations may include (i) determining a 2-signature tuple present in at least one of the data records, wherein the 2-signature tuple is composed of a first signature and a second signature; (ii) calculating, for the 2-signature tuple, a first gain representing an overall relative inefficiency of the communication sessions involving the 2-signature tuple compared to relative inefficiencies of the communication sessions involving the first signature or the second signature; (iii) determining that the first gain exceeds a first pre-determined threshold; (iv) possibly based on determining that the first gain exceeds the first pre-determined threshold, filtering the communication sessions involving the 2-signature tuple to create a subset of the communication sessions involving 1-signatures for which a size of the subset exceeds a second pre-determined threshold, and calculating a second gain representing the overall relative inefficiency of the communication sessions involving the 2-signature tuple compared to relative inefficiencies of the communication sessions involving the 1-signatures for which the size of the subset exceeds the second pre-determined threshold; (v) determining that the second gain exceeds the first pre-determined threshold; and (vi) possibly based on determining that the second gain exceeds the first pre-determined threshold, identifying the features and values that are represented by the first signature and the second signature as units of the hardware or software components that are incompatible.

Figure 9A:
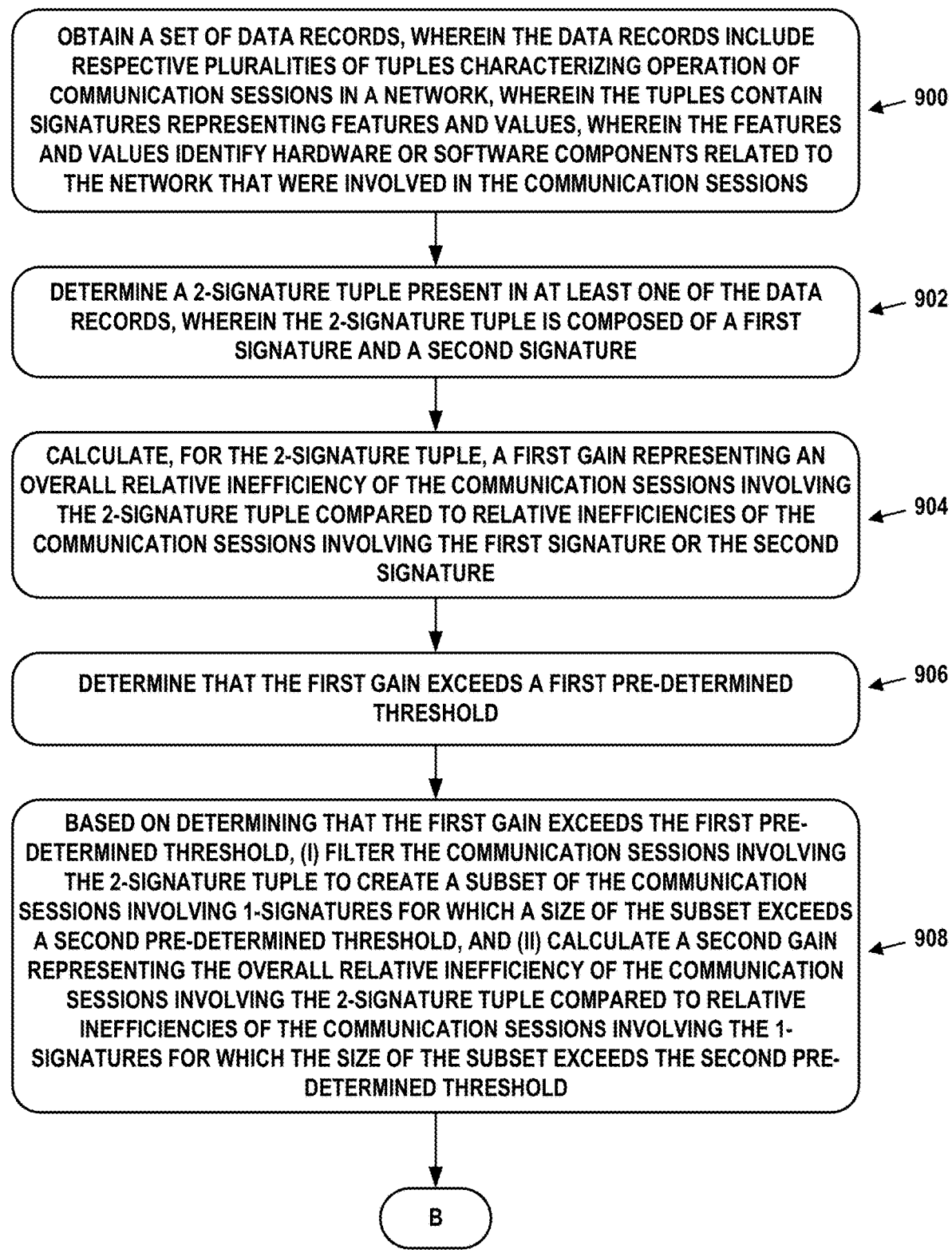
FIGS. 9A and 9B depict another flow chart, in accordance with example embodiments.
Figure 9B:
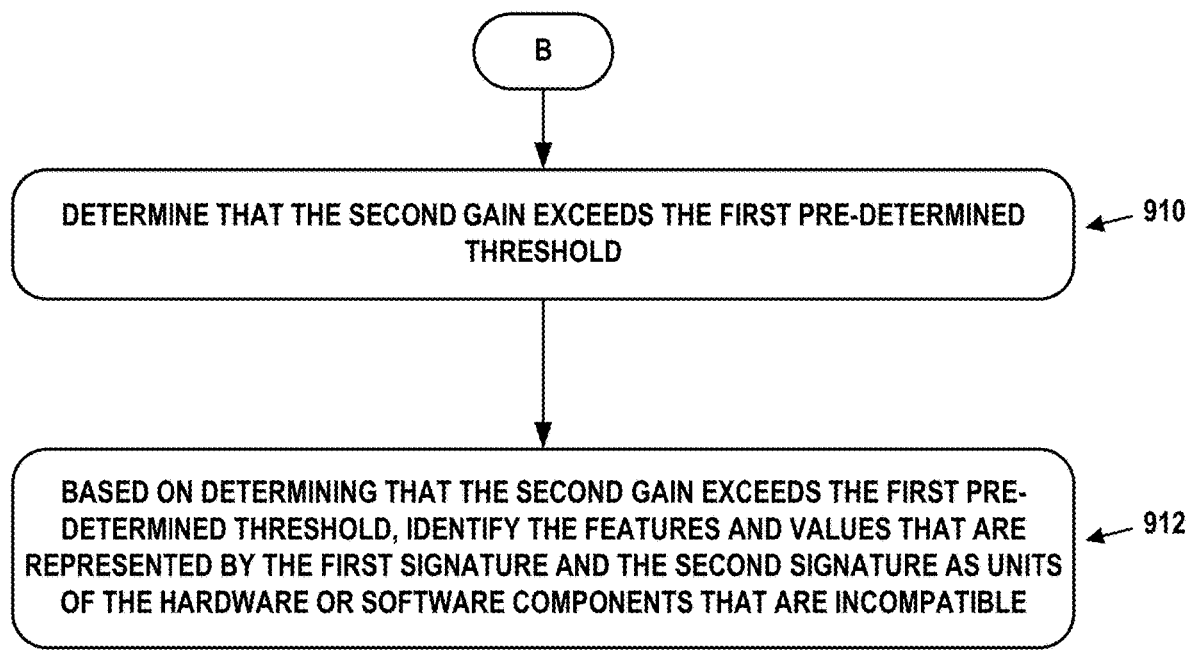

FIGS. 9A and 9B depict a flow chart illustrating an example embodiment. The process illustrated by FIGS. 9A and 9B may be carried out by a computing device, such as computing device 700. However, the process can be carried out by other types of devices or device subsystems. For example, the process could be carried out by a portable computer, such as a laptop or a tablet device, or a cluster of computing devices.

The embodiments of FIGS. 9A and 9B may be simplified by the removal of any one or more of the features shown therein. Further, these embodiments may be combined with features, aspects, and/or implementations of any of the previous figures or otherwise described herein.

Block 900 may involve obtaining a set of data records, wherein the data records include respective pluralities of tuples characterizing operation of communication sessions in a network, wherein the tuples contain signatures representing features and values, wherein the features and values identify hardware or software components related to the network that were involved in the communication sessions.

Block 902 may involve determining a 2-signature tuple present in at least one of the data records, wherein the 2-signature tuple is composed of a first signature and a second signature.

Block 904 may involve calculating, for the 2-signature tuple, a first gain representing an overall relative inefficiency of the communication sessions involving the 2-signature tuple compared to relative inefficiencies of the communication sessions involving the first signature or the second signature.

Block 906 may involve determining that the first gain exceeds a first pre-determined threshold.

Block 908 may involve, possibly based on determining that the first gain exceeds the first pre-determined threshold, (i) filtering the communication sessions involving the 2-signature tuple to create a subset of the communication sessions involving 1-signatures for which a size of the subset exceeds a second pre-determined threshold, and (ii) calculating a second gain representing the overall relative inefficiency of the communication sessions involving the 2-signature tuple compared to relative inefficiencies of the communication sessions involving the 1-signatures for which the size of the subset exceeds the second pre-determined threshold.

Block 910 may involve determining that the second gain exceeds the first pre-determined threshold.

Block 912 may involve, possibly based on determining that the second gain exceeds the first pre-determined threshold, identifying the features and values that are represented by the first signature and the second signature as units of the hardware or software components that are incompatible.

In some embodiments, the first gain is based on a difference between: (i) an overall failure ratio of the communication sessions involving the 2-signature tuple, and (ii) a maximum of a first failure ratio of the communication sessions involving the first signature and a second failure ratio of the communication sessions involving the second signature.

In some embodiments, the first pre-determined threshold is between 0.05 and 0.4. In some embodiments, the second pre-determined threshold is between 0.8 and 1.0.

In some embodiments, filtering the communication sessions involving the 2-signature tuple comprises: determining a first subset of the communication sessions involving a particular 1-signature and a second subset of the communication sessions involving the 2-signature tuple; determining a union of the first subset and a second subset; and determining that a quotient of: (i) a first cardinality of the union, and (ii) a second cardinality of the second subset exceeds the second pre-determined threshold.

Some embodiments may further involve, before identifying the features and values represented by the first signature and the second signature as units of the hardware or software components that are incompatible: (i) identifying, for the first signature, a first equivalence class of 1-signatures that are incompatible thereto, and (ii) identifying, for the second signature, a second equivalence class of 1-signatures that are incompatible thereto. In variations, the set of equivalence classes incompatible thereto may be identified.

These embodiments may further involve generating, one for each 1-signature in the first equivalence class or the second equivalence class, dependency graphs between the respective 1-signature and other 1-signatures, in which equivalence classes for the respective 1-signature are represented as nodes in the dependency graphs and edges are placed between a parent 1-signature and a child 1-signature where the data records including the child 1-signature are approximately a subset of the data records including the parent 1-signature, wherein the first signature and the second signature are included in the 1-signatures. For example, such an approximate subset may involve, for the parent signature $s_p$, and the child signature $s_c$, determining that:

$$\frac{|E(s_p) \cap E(s_c)|}{|E(s_p)|} > \gamma$$

Where $\gamma$ is a threshold defined as above.

These embodiments may further involve: determining that, in a particular dependency graph for a particular 1-signature, a particular parent 1-signature remains incompatible with the particular 1-signature after the data records including a particular child 1-signature are not considered; and removing a node representing the particular child 1-signature from the particular dependency graph.

These embodiments may further involve: determining that, in a particular dependency graph for a particular 1-signature, a particular parent 1-signature is no longer incompatible with the particular 1-signature after the data records including a particular child 1-signature are not considered; and removing a node representing the particular parent 1-signature from the particular dependency graph.

IX. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:
    obtaining a set of data records, wherein the data records include respective pluralities of tuples characterizing operation of communication sessions in a network, wherein the tuples contain signatures representing features and values, wherein the features and values identify hardware or software components related to the network that were involved in the communication sessions;
    determining a 2-signature tuple present in at least one of the data records, wherein the 2-signature tuple is composed of a first signature and a second signature;
    calculating, for the 2-signature tuple, a first gain representing an overall relative inefficiency of the communication sessions involving the 2-signature tuple compared to relative inefficiencies of the communication sessions involving the first signature or the second signature;
    determining that the first gain exceeds a first pre-determined threshold;
    based on determining that the first gain exceeds the first pre-determined threshold, (i) filtering the communication sessions involving the 2-signature tuple to create a subset of the communication sessions involving 1-signatures for which a size of the subset exceeds a second pre-determined threshold, and (ii) calculating a second gain representing the overall relative inefficiency of the communication sessions involving the 2-signature tuple compared to relative inefficiencies of the communication sessions involving the 1-signatures for which the size of the subset exceeds the second pre-determined threshold;
    determining that the second gain exceeds the first pre-determined threshold; and
    based on determining that the second gain exceeds the first pre-determined threshold, identifying the features and values that are represented by the first signature and the second signature as units of the hardware or software components that are incompatible.

2. The computer-implemented method of claim 1, wherein the first gain is based on a difference between: (i) an overall failure ratio of the communication sessions involving the 2-signature tuple, and (ii) a maximum of a first failure ratio of the communication sessions involving the first signature and a second failure ratio of the communication sessions involving the second signature.

3. The computer-implemented method of claim 1, wherein the first pre-determined threshold is between 0.05 and 0.4.

4. The computer-implemented method of claim 1, wherein the second pre-determined threshold is between 0.8 and 1.0.

5. The computer-implemented method of claim 1, wherein filtering the communication sessions involving the 2-signature tuple comprises:
   determining a first subset of the communication sessions involving a particular 1-signature and a second subset of the communication sessions involving the 2-signature tuple;
   determining a union of the first subset and a second subset; and
   determining that a quotient of: (i) a first cardinality of the union, and (ii) a second cardinality of the second subset exceeds the second pre-determined threshold.

6. The computer-implemented method of claim 1, further comprising:
   before identifying the features and values represented by the first signature and the second signature as units of the hardware or software components that are incompatible: (i) identifying, for the first signature, a first equivalence class of 1-signatures that are incompatible thereto, and (ii) identifying, for the second signature, a second equivalence class of 1-signatures that are incompatible thereto.

7. The computer-implemented method of claim 6, further comprising:
   generating, one for each 1-signature in the first equivalence class or the second equivalence class, dependency graphs between the respective 1-signature and other 1-signatures, in which equivalence classes for the respective 1-signature are represented as nodes in the dependency graphs and edges are placed between a parent 1-signature and a child 1-signature where the data records including the child 1-signature are approximately a subset of the data records including the parent 1-signature, wherein the first signature and the second signature are included in the 1-signatures.

8. The computer-implemented method of claim 7, further comprising:
   determining that, in a particular dependency graph for a particular 1-signature, a particular parent 1-signature remains incompatible with the particular 1-signature after the data records including a particular child 1-signature are not considered; and
   removing a node representing the particular child 1-signature from the particular dependency graph.

9. The computer-implemented method of claim 7, further comprising:
   determining that, in a particular dependency graph for a particular 1-signature, a particular parent 1-signature is no longer incompatible with the particular 1-signature after the data records including a particular child 1-signature are not considered; and
   removing a node representing the particular parent 1-signature from the particular dependency graph.

10. An article of manufacture including a non-transitory computer-readable medium, having stored thereon program instructions that, upon execution by a computing device, cause the computing device to perform operations comprising:
   obtaining a set of data records, wherein the data records include respective pluralities of tuples characterizing operation of communication sessions in a network, wherein the tuples contain signatures representing features and values, wherein the features and values identify hardware or software components related to the network that were involved in the communication sessions;
   determining a 2-signature tuple present in at least one of the data records, wherein the 2-signature tuple is composed of a first signature and a second signature;
   calculating, for the 2-signature tuple, a first gain representing an overall relative inefficiency of the communication sessions involving the 2-signature tuple compared to relative inefficiencies of the communication sessions involving the first signature or the second signature;
   determining that the first gain exceeds a first pre-determined threshold;
   based on determining that the first gain exceeds the first pre-determined threshold, (i) filtering the communication sessions involving the 2-signature tuple to create a subset of the communication sessions involving 1-signatures for which a size of the subset exceeds a second pre-determined threshold, and (ii) calculating a second gain representing the overall relative inefficiency of the communication sessions involving the 2-signature tuple compared to relative inefficiencies of the communication sessions involving the 1-signatures for which the size of the subset exceeds the second pre-determined threshold;
   determining that the second gain exceeds the first pre-determined threshold; and
   based on determining that the second gain exceeds the first pre-determined threshold, identifying the features and values that are represented by the first signature and the second signature as units of the hardware or software components that are incompatible.

11. The article of manufacture of claim 10, wherein the first gain is based on a difference between: (i) an overall failure ratio of the communication sessions involving the 2-signature tuple, and (ii) a maximum of a first failure ratio of the communication sessions involving the first signature and a second failure ratio of the communication sessions involving the second signature.

12. The article of manufacture of claim 10, wherein the first pre-determined threshold is between 0.05 and 0.4.

13. The article of manufacture of claim 10, wherein the second pre-determined threshold is between 0.8 and 1.0.

14. The article of manufacture of claim 10, wherein filtering the communication sessions involving the 2-signature tuple comprises:
   determining a first subset of the communication sessions involving a particular 1-signature and a second subset of the communication sessions involving the 2-signature tuple;
   determining a union of the first subset and a second subset; and
   determining that a quotient of: (i) a first cardinality of the union, and (ii) a second cardinality of the second subset exceeds the second pre-determined threshold.

15. The article of manufacture of claim 10, the operations further comprising:

before identifying the features and values represented by the first signature and the second signature as units of the hardware or software components that are incompatible: (i) identifying, for the first signature, a first equivalence class of 1-signatures that are incompatible thereto, and (ii) identifying, for the second signature, a second equivalence class of 1-signatures that are incompatible thereto.

16. The article of manufacture of claim 15, the operations further comprising:

generating, one for each 1-signature in the first equivalence class or the second equivalence class, dependency graphs between the respective 1-signature and other 1-signatures, in which equivalence classes for the respective 1-signature are represented as nodes in the dependency graphs and edges are placed between a parent 1-signature and a child 1-signature where the data records including the child 1-signature are approximately a subset of the data records including the parent 1-signature, wherein the first signature and the second signature are included in the 1-signatures.

17. The article of manufacture of claim 16, the operations further comprising:

determining that, in a particular dependency graph for a particular 1-signature, a particular parent 1-signature remains incompatible with the particular 1-signature after the data records including a particular child 1-signature are not considered; and removing a node representing the particular child 1-signature from the particular dependency graph.

18. The article of manufacture of claim 16, the operations further comprising:

determining that, in a particular dependency graph for a particular 1-signature, a particular parent 1-signature is no longer incompatible with the particular 1-signature after the data records including a particular child 1-signature are not considered; and removing a node representing the particular parent 1-signature from the particular dependency graph.

19. A computing device comprising:

a processor;

memory; and program instructions, stored in the memory, that upon execution by the processor cause the computing device to perform operations comprising:

obtaining a set of data records, wherein the data records include respective pluralities of tuples characterizing operation of communication sessions in a network, wherein the tuples contain signatures representing features and values, wherein the features and values identify hardware or software components related to the network that were involved in the communication sessions;

determining a 2-signature tuple present in at least one of the data records, wherein the 2-signature tuple is composed of a first signature and a second signature;

calculating, for the 2-signature tuple, a first gain representing an overall relative inefficiency of the communication sessions involving the 2-signature tuple compared to relative inefficiencies of the communication sessions involving the first signature or the second signature;

determining that the first gain exceeds a first pre-determined threshold;

based on determining that the first gain exceeds the first pre-determined threshold, (i) filtering the communication sessions involving the 2-signature tuple to create a subset of the communication sessions involving 1-signatures for which a size of the subset exceeds a second pre-determined threshold, and (ii) calculating a second gain representing the overall relative inefficiency of the communication sessions involving the 2-signature tuple compared to relative inefficiencies of the communication sessions involving the 1-signatures for which the size of the subset exceeds the second pre-determined threshold;

determining that the second gain exceeds the first pre-determined threshold; and based on determining that the second gain exceeds the first pre-determined threshold, identifying the features and values that are represented by the first signature and the second signature as units of the hardware or software components that are incompatible.

20. The computing device of claim 19, wherein the first gain is based on a difference between: (i) an overall failure ratio of the communication sessions involving the 2-signature tuple, and (ii) a maximum of a first failure ratio of the communication sessions involving the first signature and a second failure ratio of the communication sessions involving the second signature.

\* \* \* \* \*